US006557122B1

(12) United States Patent
Sugauchi et al.

(10) Patent No.: US 6,557,122 B1
(45) Date of Patent: Apr. 29, 2003

(54) NOTIFICATION SYSTEM FOR INFORMING A NETWORK USER OF A PROBLEM IN THE NETWORK

(75) Inventors: Kiminori Sugauchi, Yokohama (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/287,189

(22) Filed: Apr. 6, 1999

(30) Foreign Application Priority Data

Apr. 7, 1998 (JP) .......................................... 10-094782

(51) Int. Cl.[7] .............................................. G06F 11/00
(52) U.S. Cl. .............................. 714/57; 714/4; 709/203
(58) Field of Search ...................... 714/4, 57; 709/223, 709/224, 238, 250, 203, 219; 370/400, 242, 351; 340/825.06; 705/1; 455/424

(56) References Cited

U.S. PATENT DOCUMENTS 5,119,377 A * 6/1992 Cobb et al.
5,307,354 A * 4/1994 Cramer et al.
5,432,715 A * 7/1995 Shigematsu et al.
6,006,206 A * 12/1999 Smith et al.
6,038,689 A * 3/2000 Schmidt et al.
6,192,034 B1 * 2/2001 Hsieh et al.

OTHER PUBLICATIONS

"Web–Based Network Management" Sun World, Sep. 1997, pp. 28–40.
The ATM Forum af–nm–0019.000, Revision 1.04, Oct. 1994, pp. 1–26.
"A Hands–on Look at JAVA Mobile Agents", IEEE Internet Computing, vol 1, No. 4, Jul.–Aug. 1997, pp. 21–31.

* cited by examiner

Primary Examiner—Gopal C. Ray
(74) Attorney, Agent, or Firm—Antonelli, Terry, Stout, & Kraus, LLP

(57) ABSTRACT

When a problem occurs in communication carried out by a user, information concerning the problem is notified to the user. A network management system transfers a problem notification program to a network device adjacent to a place experiencing the problem. The problem notification program notifies "communication impossible" to a terminal of a transmission source of data output from an output port of the network device.

14 Claims, 22 Drawing Sheets

FIG.6

| PROGRAM IDENTIFIER | TRANSMISSION SOURCE TERMINAL | TRANSMISSION DESTINATION TERMINAL |
|---|---|---|
| MA_01 | A_host | X_host |
| MA_02 | B_host | Y_host |
| MA_03 | C_host | Z_host |
| ⋮ | ⋮ | ⋮ |

| PROBLEM NOTIFICATION PROGRAM IDENTIFIER | TRANSMISSION DESTINATION TERMINAL | STATUS | COMMENT | TIME |
|---|---|---|---|---|
| SMA_01 | A_host | COMMUNICATION IMPOSSIBLE | | 13:00 |
| SMA_11 | B_host | COMMUNICATION IMPOSSIBLE | | 13:30 |
| SMA_21 | C_host | COMMUNICATION RESTORATION | | 13:40 |
| ⋮ | ⋮ | ⋮ | ⋮ | ⋮ |

FIG.22

| PROBLEM NOTIFICATION IDENTIFIER | TRANSMISSION SOURCE TERMINAL | TRANSMISSION DESTINATION TERMINAL |
|---|---|---|
| NE_01 | A_host | X_host |
| NE_02 | B_host | Y_host |
| NE_03 | C_host | Z_host |
| ⋮ | ⋮ | ⋮ |

FIG.24

| PROBLEM NOTIFICATION PROGRAM IDENTIFIER | PROBLEM INFORMATION NOTIFICATION IDENTIFIER | TRANSMISSION DESTINATION TERMINAL | STATUS | TIME |
|---|---|---|---|---|
| NE1 | NE1_01 | A_host | COMMUNICATION IMPOSSIBLE | 13:00 |
| NE2 | NE2_11 | B_host | COMMUNICATION IMPOSSIBLE | 13:30 |
| NE3 | NE3_21 | C_host | UNDER SEARCH | 13:40 |
| ⋮ | ⋮ | ⋮ | ⋮ | ⋮ |

NOTIFICATION SYSTEM FOR INFORMING A NETWORK USER OF A PROBLEM IN THE NETWORK

BACKGROUND OF THE INVENTION

1. Field of the Invention

The present invention relates to a technique for notifying a user of a network system information that a problem has occurred in the network system.

2. Description of Related Art

Notification of information regarding a problem occurring in a network system to a user of the network system has hitherto been carried out in the following manner.

A network management system for monitoring the status of network devices constituting the network system and a transmission path is provided on the network system. When a problem occurs in communication, a user who is involved in the communication inquires to a network administrator using a telephone or the like. In response to the inquiry from the user, the network administrator collects problem information by using the network management system to identify the cause of the problem, and then notifies the status to the user.

However, with this method, in a case of a large-scale network containing a large number of users, a work load imposed on the network administrator in supporting users when problems occur is increased, and it is difficult to properly support the inquiries from the users.

Therefore, in order to overcome the above problem, there has been proposed a customer network management technique (in af-nm-0019.0002 of ATM Forum) in which the information managed by the network management system is made public to the users of the network system on the network system, whereby the users have free access to the information about the network system.

Further, there has also been proposed a technique in which an HTTP server is disposed in an individual network device, and the status information monitored by the individual network device itself is made public to the users of the network system on the HTTP server, whereby the users can be given free access to the status information monitored by any network device by using a World Wide Web browser, and this technique is described on page 33 in the September issue of 1997 of SunWorld.

Further, as a technique related to a network system, an agent technique for carrying out processing by sharing the processing load among devices constituting a network system is also known. As an example of this type of agent technique, there is a technique which defines a communication control and an interface for implementing an execution environment of a mobile program on each device, so that the device on which the mobile program is executed is continually changed, under control of the mobile program itself, and this technique is described from page 21 to page 31 of IEEE Internet Computing No. 4, Vol. 1, (July, August issues of 1997).

According to the customer network management technique, desired information cannot be properly obtained unless each user is aware of the construction of the network system and the way in which an application is used in the network system. Further, since the network system is expanded as occasion demands due to increase in the number of users, it is unrealistic to expect all the of users to have sufficient grasp of the construction of the network system, etc. In addition, with this technique, it is necessary path for the network management system to continually monitor each network device and each transmission at all times.

Further, in the technique in which each network device makes the status information monitored by itself public to the users of the network system on the HTTP server, no user can identify a network device from which the information should be obtained unless the user grasps the construction of the network system and the way in which the application being is in the network system.

Accordingly, when a problem occurs in a communication being carried out by a user, the user cannot properly obtain the information on the problem with the above techniques.

SUMMARY OF THE INVENTION

Therefore, an object of the present invention is to provide a network system in which when a problem occurs in a communication being carried out by a user, the information about the problem is properly notified (presented) to the user while reducing the load imposed on the network administrator.

Another object of the present invention is to provide a network system which can also reduce the load of each process in a network management system, which must be performed to supply the information about the problem concerned to the user.

In order to attain the above objects, the present invention provides a network system including a plurality of terminal devices and a plurality of network devices for relaying data between the terminal devices, wherein each of the network devices includes means for detecting a terminal device serving as a transmission side transmitting data output from an output port of the network device itself at which a problem occurs, and means for notifying problem information indicating occurrence of the problem to the terminal device serving as the transmission side thus detected.

According to the network system as described above, information indicating occurrence of a problem can be automatically and properly notified to all the terminal devices which are to carry out communication using the output port of the network device at which the problem occurs.

BRIEF DESCRIPTION OF THE DRAWINGS

FIG. 6 is a diagram showing the construction of a notifying table according to the first embodiment of the present invention;

FIG. 22 is a diagram showing the construction of a notifying table according to the fourth embodiment of the present invention;

FIG. 24 is a diagram showing the construction of a display table according to the fourth embodiment of the present invention.

DETAILED DESCRIPTION OF THE PREFERRED EMBODIMENTS

Preferred embodiments of the present invention will be described in the following with reference to the accompanying drawings.

Figure 1:
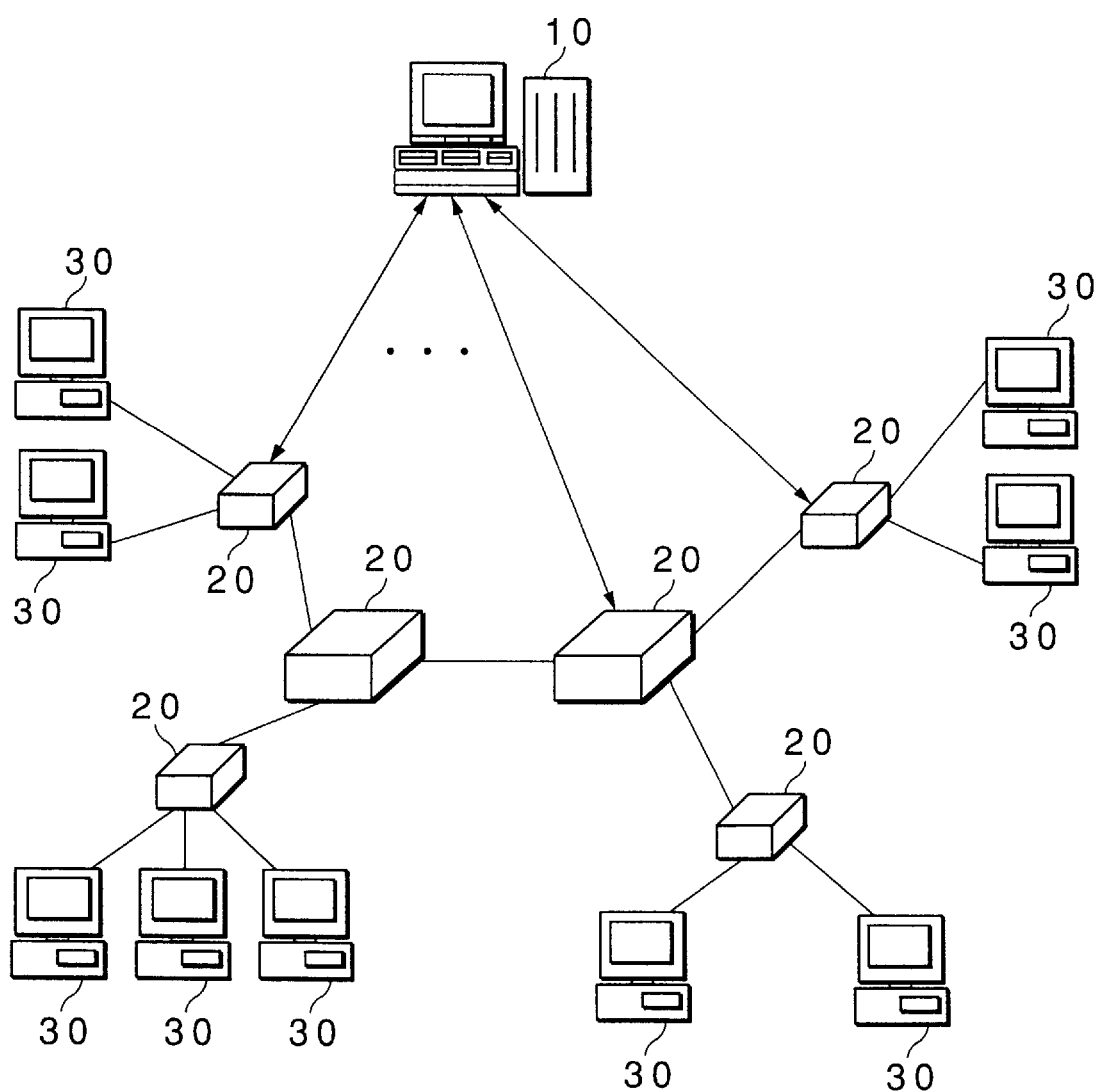
FIG. 1 is a block diagram showing the construction of a network system according to a first embodiment of the present invention.

FIG. 1 shows a construction of a network system according to a first embodiment of the present invention.

In FIG. 1, each network device 20 performs relay processing such as routing of data to be transmitted/received between terminals 30. A network management system 10 collects the operational status and problem information of the network devices 20, and controls the network devices 20.

Figure 2:
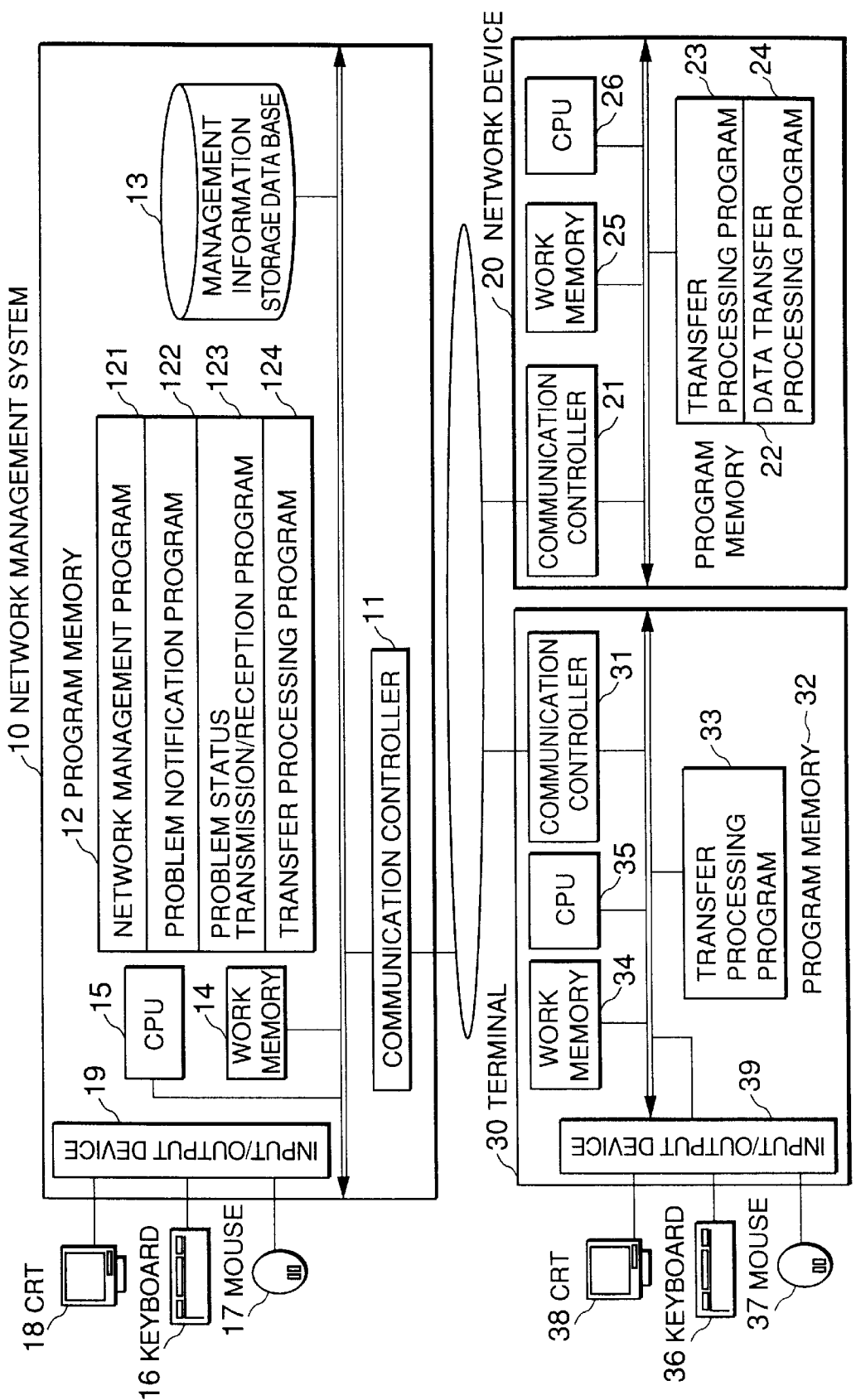
FIG. 2 is a block diagram showing the construction of each device of the network system according to the first embodiment of the present invention.

FIG. 2 shows the internal construction of the terminal 30, the network management system 10 and the network devices 20.

First, the construction of the network management system 10 will be described.

In FIG. 2, a communication control device 11 performs transmission/reception control to transmit/receive data with each management target network device 20. A program memory 12 is used to store a network management program 121, a problem notification program 122, a problem status transmission/reception program 123, a transfer processing program 124 and other various programs described later.

The network management program 121 controls the network devices 20 by collecting management information from the network devices 20 and then storing the management information into a management information storing data base 13 or changing the management information of the network devices 20. The problem notification program 122 is an agent which moves from the network management system 10 onto any network device 20, analyzing a transmission/reception destination of data to be relayed by the network device 20 to which the agent moves, and performs a control operation to notify problem information to a terminal 30 as occasion demands. The problem status transmission/reception program 123 communicates data with the problem notification program 122 to inform the problem information to the problem notification program 122 or to collect log information transmitted from the problem notification program 122 and store it into the management information storing data base 13. The transfer processing program 124 controls programs moving between devices, such as the problem notification program 122, etc., and has the same function as the same type of program on the network devices 20 and the terminals 30.

A work memory 14 is a working area for executing each of the above programs. A central processing unit CPU 15 controls access to the memories 12, 14 and the management information storing data base 13 and executes each of the above programs. A keyboard 16, a mouse 7 and a display device CRT 18 constitute an input/output interface between the user and the network management system 10, and an input/output controller 19 controls the input/output operation of these elements.

Next, the construction of each network device 20 will be described.

In FIG. 2, a communication controller 21 controls data transmission/reception between the network device 20 and the network management system 10. A program memory 22 is used to store a transfer processing program 23 and a data transfer processing program 24 therein, and further to store various kinds of programs described later. Here, the data transfer processing program 24 performs data relay processing. The transfer processing program 23 performs the same processing as the transfer processing program 124 in the network management system 10.

A work memory 25 is a working area used at the time of executing a program which moves and is placed in the memory, such as the problem notification program 122 or a program in the program memory 22, or at the time of storing information created by these programs.

The central processing unit CPU 26 controls the access to the memories 22, 25 and executes each program.

Next, the construction of the terminal 30 will be described.

In FIG. 2, a communication controller 31 performs data transmission/reception processing. A program memory 32 is used to store a transfer processing program 33. The transfer processing program 33 performs the same processing as the transfer processing programs 134, 24 on the network management system 10 and the network device 20. The program memory 32 contains not only the transfer processing program 33, but also a program for executing a task requested by a user, a program requesting another terminal to perform processing and other kinds of programs described later.

A work memory 34 is a working area used at the time of executing a program in the program memory 32, at the time of executing a program moved by the transfer processing program 33 or at the time of storing information which is produced by these programs. A central processing unit CPU 35 executes each program. A keyboard 36, a mouse 37 and a display device CRT 38 constitutes an input/output interface between the user and the terminal 30, and an input/output controller 39 controls the data input/output from these elements.

Next, the operation of the network system according to the present embodiment will be described along the processing flow on a time basis.

First, the terminal 30 accepts the user's setting of a problem notification by a set accept program (omitted from FIG. 2). This is accepted on a setting window 301 shown in FIG. 3.

The setting window 301 is a selection box through which a user selects a notification method for notifying information to the user (i.e., how to notify information to the user) when the user receives notification information or status information described later. In this case, there are provided three types of choices (items to be selected), that is, a detailed display notification 302 for immediately displaying information when the information is received, an alarm notification 303 for notifying reception of problem information to the user with sound, an icon or the like without displaying the information in detail, and a non-notification 304 which takes no action (outputs no information) even when information is received until the user indicates display of a problem information window described later by him(her)-self. The setting window 301 is provided with a special notification method column 305. In this column, a transmission destination 306 which makes the problem information notification method thereof different from those of the other transmission destinations, and the problem information notification method for the transmission destination are accepted.

The choice selected by the user (i.e., the item set by the user) in the setting window 301 is stored as a local file on the terminal 30. This set item may be set in the network management system 10, for example, and transferred to each terminal 30.

Next, the operation of the problem notification program 122 will be described. Here, the operation of the problem notification program 122 actually means the operation of the agent which is defined by the problem notification program 122.

Figure 4:
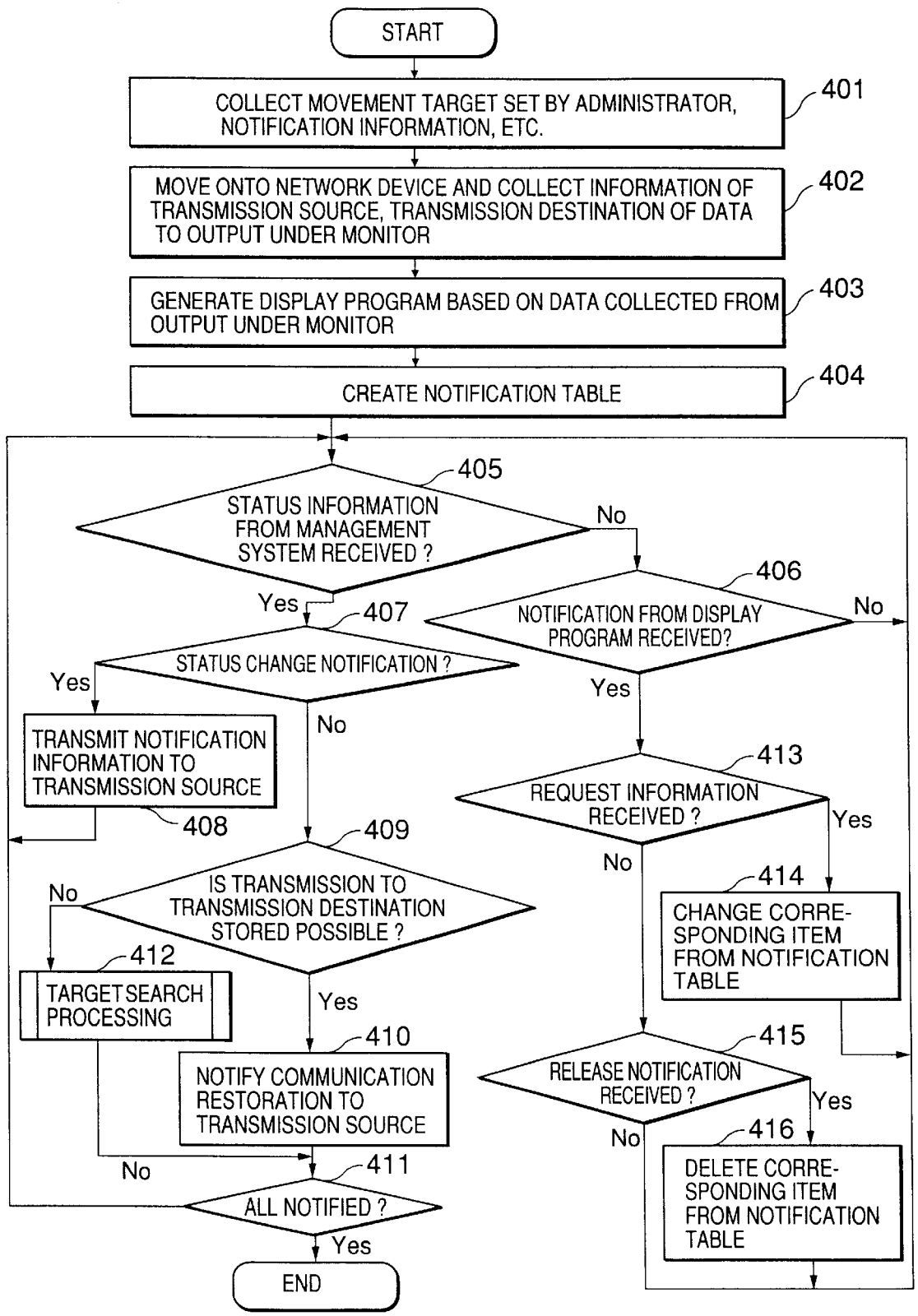
FIG. 4 is a flowchart showing the processing of a problem notification program according to the first embodiment of the present invention.

FIG. 4 shows the procedure of the processing carried out by the problem notification program 122.

As shown in FIG. 4, the problem notification program 122 receives information on a moving destination which is set by the administrator of the network management system and to which the problem notification program 122 is to be moved, information of a monitor target port and notification information which is problem information (step 401). Here, the moving destination indicated by the destination information received corresponds to a network device 20 having a port which is directly connected to a problem place which is identified by the administrator through the network management system 10, for example, and the monitor target port is the port which is directly connected to the problem place.

Figure 5:
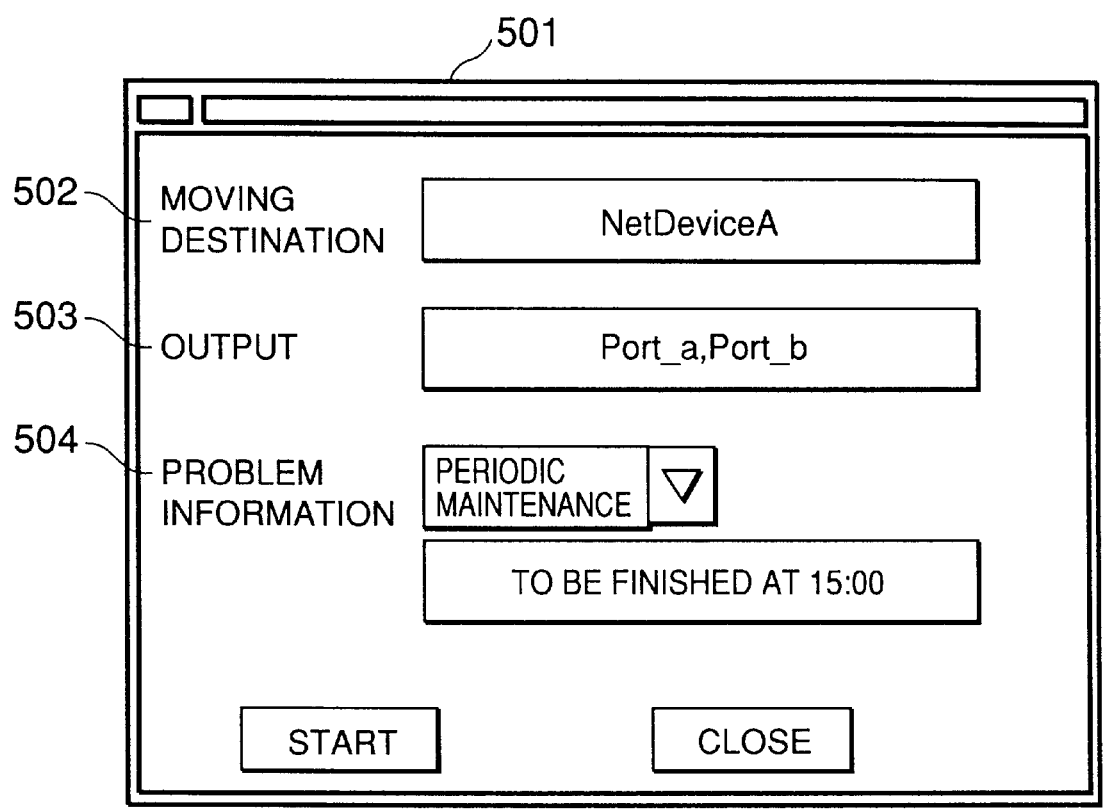
FIG. 5 is a diagram showing the setting window according to the first embodiment of the present invention.

The accepting of the information on the moving destination and the information on the problem status from the administrator is performed in a setting frame 501 shown in FIG. 5 by the set accept program on the network management system 10 omitted from FIG. 2. At the moving destination 502 of the setting window 501, the network device 20 to which the problem notification program 122 moves is assigned. A port number 503 monitored at the moving destination accepts a port which monitors whether data flows on the network device 20 to which the problem notification program 122 moves. The problem information 504 accepts notification information to be notified to the user. As notification information, the administrator may indicate whether a communication failure occurs due to network abnormality or a maintenance operation.

The problem notification program 122 moves onto a network device 20 indicated by the information of the moving destination received. On the network device 20 (moving destination), the port indicated as the monitor target is monitored, and if data flows into the port being monitored, the information on a transmission destination and a transmission source of the data is collected on the basis of the information of the header portion of the data (step 402).

When recognizing the data transmission destination and the data transmission source, the problem notification program 122 generates a display program for transmitting problem information to the transmission source, sets an identifier for the display program and then notifies the terminal information of the moving destination which indicates the terminal of the transmission source, a transmission destination terminal which indicates the terminal of the transmission destination thus recognized, an identifier of the problem notification program 122, notification information received from the administrator by the problem notification program 122, and status information indicating "communication impossible" (step 403). Thereafter, the display program moves as an agent to a terminal 30 indicated by the received information of the terminal of the transmission source, and operates on the terminal 30 which is the moving destination.

When the display program is moved to the terminal 30, the problem notification program 122 creates in the work memory a notification table which holds the data on the display program (step 404).

FIG. 6 shows the construction of the notification table thus created.

An identifier which is delivered from the problem notification program 122 to the display program is stored in a program identifier 602 of each entry in the notification table 601 in FIG. 6. The information on the terminal of a transmission destination and the information on the terminal of a transmission source for data which causes generation and movement of a display program are stored in the transmission destination terminal 603 and the transmission source terminal 604, respectively. This table is used to judge whether a new display program is to be generated when data later flows into a port being monitored.

That is, when the display program is created (step 403), the problem notification program 122 checks whether the transmission source terminal of the data flowing to the port being monitored is registered as a transmission source terminal in the notification table. If it is not registered, the display program is created as described above. If the transmission source terminal of the data flowing to the port being monitored is registered as a transmission source terminal in the notification table and the transmission destination terminal registered in the entry at which the transmission source terminal is registered is different from the transmission destination terminal of the data flowing to the port concerned, it is notified as problem information to the display program of the corresponding program identifier that no data can be transmitted to the transmission destination terminal of the data thus flowing to the port. If the transmission source terminal of the data flowing to the port being monitored is registered as a transmission source terminal in the notification table and the transmission destination terminal registered in the entry of the transmission source terminal is the same as the transmission destination terminal of the data thus flowing, no action is taken.

When the problem is restored or a periodic maintenance operation is completed, the network management system 10 sends a restoration notification to the problem notification program 122 which moves to the network device 20 at the moving destination set by the administrator. When receiving this restoration notification (step 405, 407), the problem notification program 122 checks whether it is possible to communicate with the transmission destination terminal registered in the notification table in the work memory (step 409). If the communication is possible, the status information indicating that it is possible to communicate with the transmission destination terminal is notified to the display program of the display program identifier registered in the entry at which the transmission destination terminal is registered (step 411), and the entry at which the transmission destination terminal with which the communication can be made is deleted from the notification table, thereby completing the processing.

On the other hand, if a transmission destination terminal exists with which no communication can be made, target search processing for judging whether there is some defect on the network is carried out (step 412).

Figure 7:
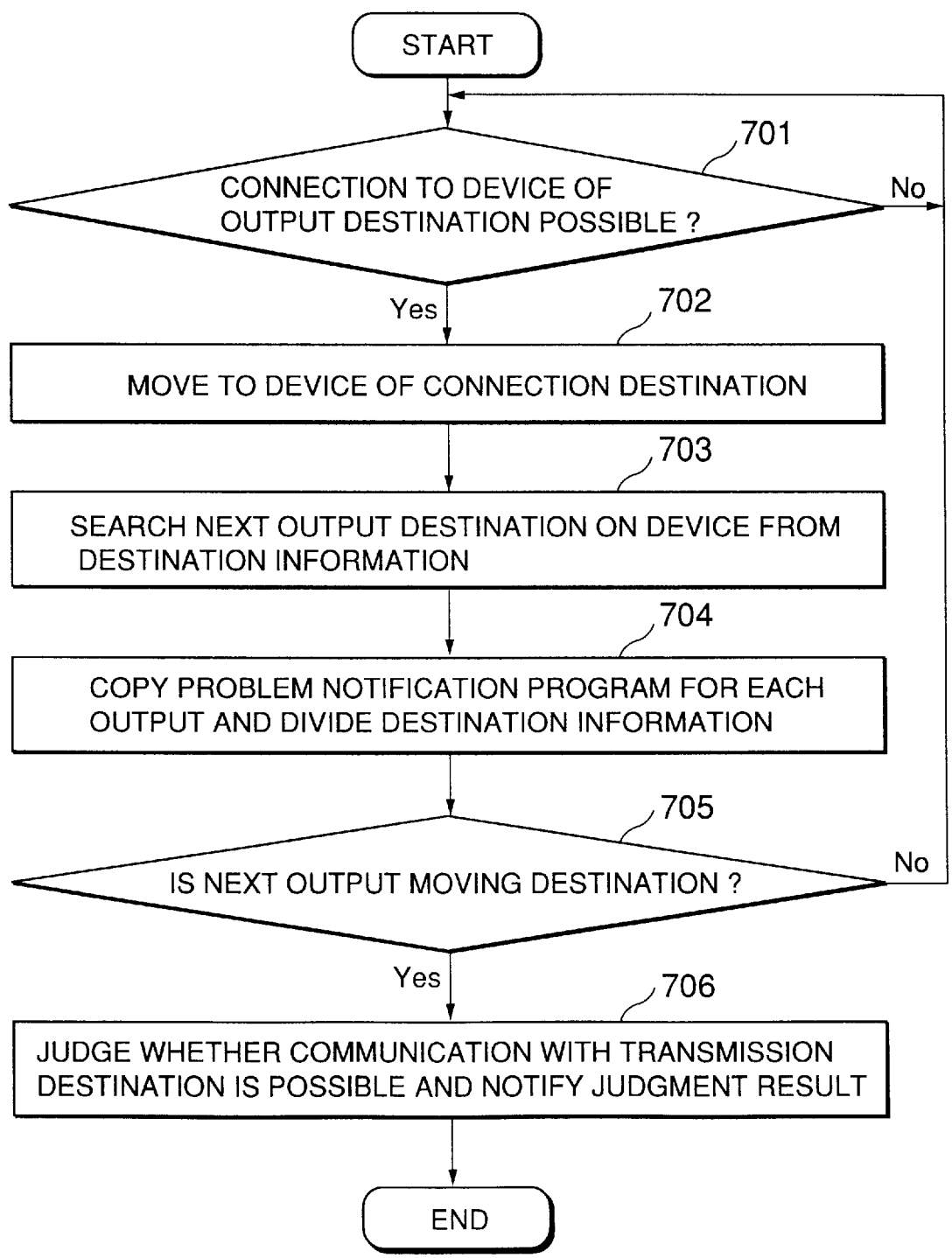
FIG. 7 is a flowchart showing target search processing of a problem notification program according to the first embodiment of the present invention.

FIG. 7 shows the processing procedure of the target search processing.

First, the problem notification program 122 attempts to move to the network device 20 which is directly connected to the output port being monitored (step 701). If it is movable, it moves with a notification table comprising entries of transmission destination terminals to which no communication can be made (step 702). Thereafter, the input/output relationship of the network device 20 at the moving destination is checked, and it is judged which output port is used by the transmission destination terminal contained in the notification table (step 703). At this time, if the output port used by the transmission destination terminal is varied in accordance with the transmission destination terminal, the problem notification program 122 is copied for each output port (step 704). Each problem notification program 122 thus copied holds the notification table, and the notification table thus held holds only the entry of the transmission destination terminal which uses each output port.

Each problem notification program 122 judges whether it is movable to the next network device 20 of the corresponding output port. If it is movable, it moves to the next network device 20, and the same process as described above is applied to the network device of the moving destination (step 705). The problem notification program 122 which has arrived at the network device 20 just before the transmission destination terminal registered in the notification table checks whether it can communicate with the transmission destination terminal. If the communication is impossible, it is informed as notification information to the display program of the identifier registered in the entry of the transmission destination terminal that the transmission destination terminal itself may possibly have a problem. If the communication can be carried out, it is notified as status information to the above display program that the communication can be carried out, and then the processing is finished (step 706).

In FIG. 4, the network management system 10 sends a status change notification to the problem notification program 122 moved to the network device 20 serving as the moving destination set by the administrator when information to be notified to the user is changed. Upon receiving this notification (step 405), the problem notification program 122 notifies the content of the status change notification as notification information to all the display programs whose display program identifiers are registered in the notification table (step 408)

Upon receiving the notification from the display program, the problem notification program 122 moved onto the network device 20 indicated by the information on the moving destination which is received from the administrator performs the processing corresponding to the content thus received.

This processing will be described in the following together with the processing of the display program.

Figure 8:
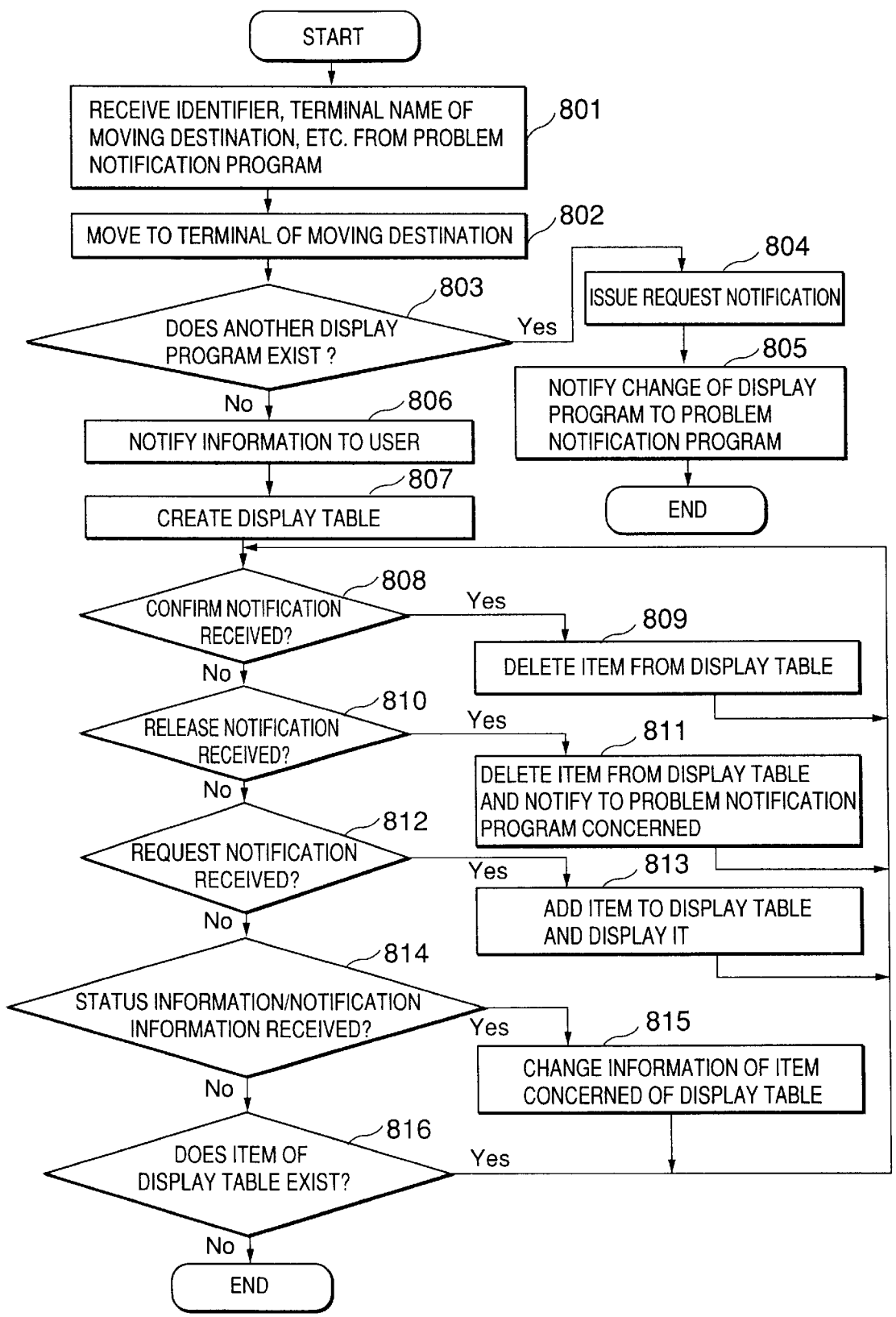
FIG. 8 is a flowchart showing the processing of a display program according to the first embodiment of the present invention.

FIG. 8 shows the operation of the display program. In this case, the operation of the display program is actually the operation of an agent defined by a display program.

As shown in FIG. 8, when a display program is generated by the problem notification program 122, the display program receives from the problem notification program 122 the identifier of the display program, the terminal of the moving destination, notification information, a transmission destination terminal registered in an entry in which the identifier of the display program of the notification table is registered, and the identifier of the problem notification program 122 (step 801). Thereafter, the display program moves to the terminal of the moving destination thus received (step 802).

The display program moved onto the terminal first judges whether another display program exists on the terminal 30 (step 803). If it exists on the terminal 30, the notification information, the transmission destination terminal and the identifier of the problem notification program 122 are delivered as a request notification to the other display program (step 804). Further, the identifier of the other display program to which the request notification is delivered is notified as request information to the problem notification program 122 (step 805).

Upon receiving the request information from the display program (step 406, 413 in FIG. 4), the problem notification program 122 changes the identifier of the display program transmitting the notification in the notification table to the identifier of the other display program notified with the request information (step 4142 of FIG. 4).

Figure 3:
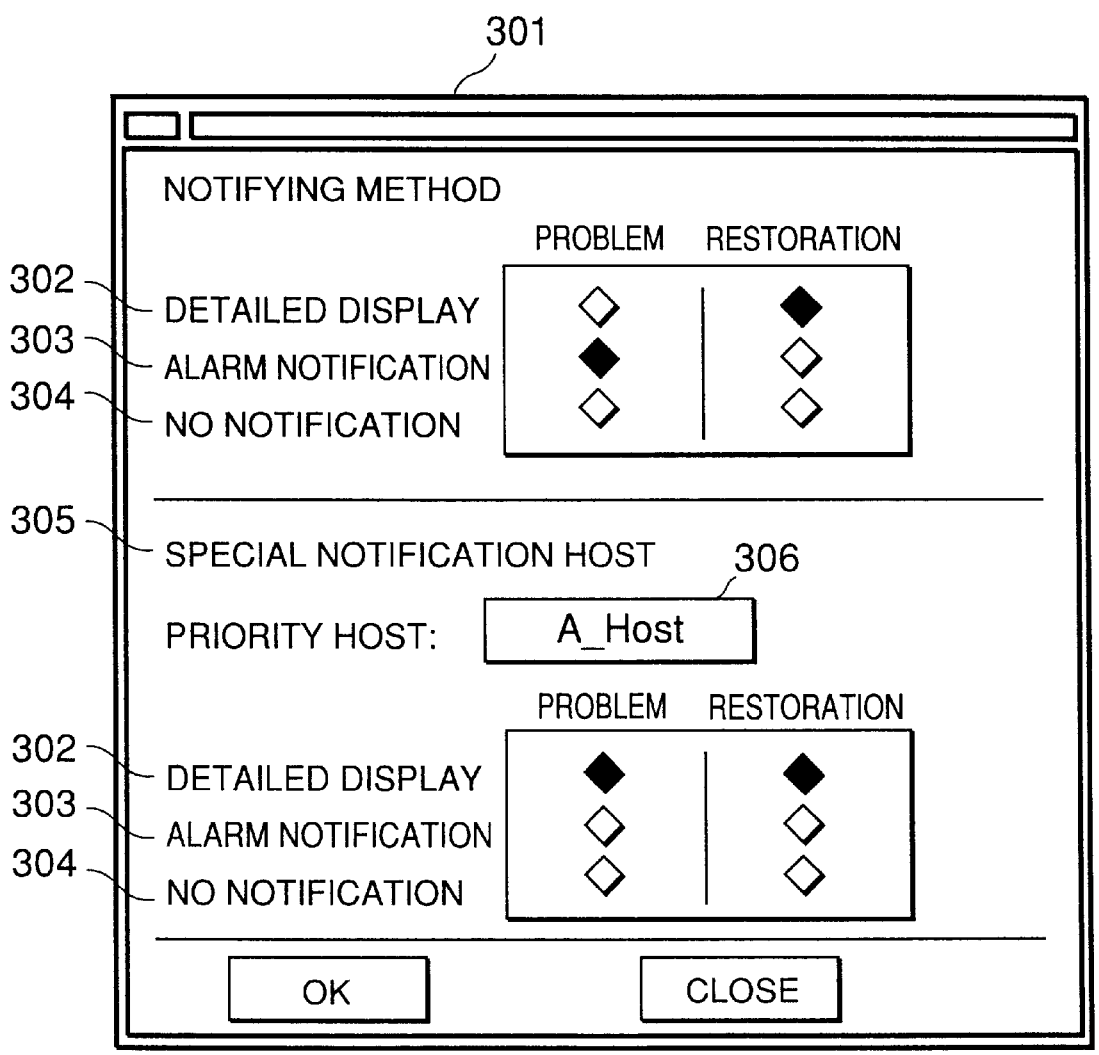
FIG. 3 is a diagram showing a setting window according to the first embodiment of the present invention.

If no other display program exists on the terminal 30, the display program refers to a local file in which the set item based on the setting window shown in FIG. 3 is stored, and notifies the transmission destination terminal and the notification information received from the problem notification program 122 to the user according to the notification method based on the set item (step 806).

Figures 9, 10:
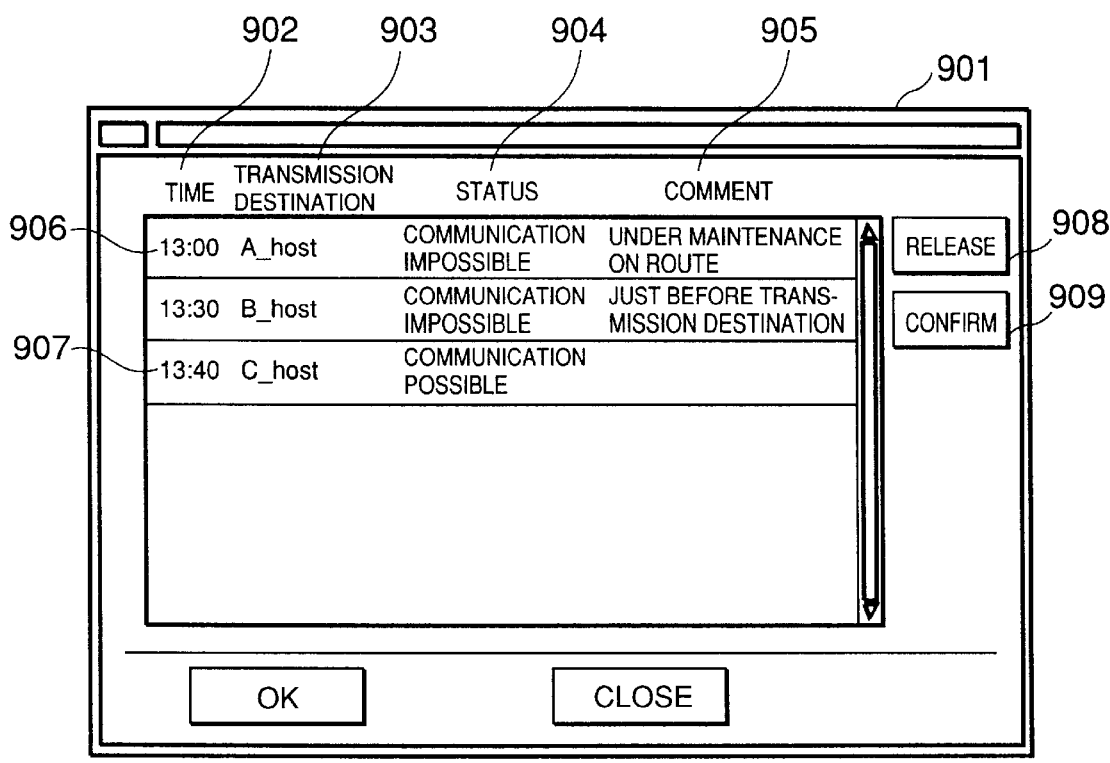
FIG. 9 is a diagram showing a problem notifying window according to the first embodiment of the present invention.
FIG. 10 is a diagram showing the construction of a display table according to the first embodiment of the present invention.

This notification, for example, is carried out by using a problem information window 901 shown in FIG. 9. The problem information window 901 is expressed in the form of a list for every data transmission destination.

"Time" 902 in FIG. 9 is varied in accordance with the type of information to be displayed. If "status" 904 described later is "communication impossible", the display "time" represents the time at which the problem notification program 122 first receives the data to the corresponding transmission destination terminal. If the status 904 is "communication possible", the display "time" represents the time at which the problem notification program 122 judges that the communication with the transmission destination terminal can be made. The transmission destination terminal 903 represents the transmission destination for data which are received from the problem notification program 122 by the display program. The status 904 is a field representing the status information which is notified from the problem notification program, and it represents two kinds of displays, "communication possible" and "communication impossible".

The problem notification program 122 transmits the status information together with time information to be displayed on d notification time 902. A comment 905 is a field representing the notification information which is received or notified from the problem notification program 122. The first line in FIG. 9 is displayed according to the notification information which is set by the administrator and received from the problem notification program 122, and the second line is displayed according to the notification information displayed when the notification information indicating that the transmission destination terminal itself may possibly have a problem is received from the problem notification program 122 which moves to the position just before the transmission destination terminal. The color of characters on each line in FIG. 9 is changed on the basis of the status. For example, the characters for "communication possible" line are displayed in black 906, and the characters for "communication impossible" are displayed with red 907.

When displaying the problem information window as described above, the display program creates a display table 1001 shown in FIG. 10 in a work memory (step 807).

Problem notification program identifier 1002 on the display table of each entry of the display table 1001 represents the problem notification program 122 which generates the display program. Further, transmission destination 1003 represents the transmission destination terminal notified from the problem notification program 122. Status 1004, time 1005 and comment 905 are used to store information displayed on the status 904, the time 902 and the comment 905 of the problem notification window, respectively.

Here, each entry of the display table 1001 corresponds to each line of the problem information window.

The display program performs the following processing when receiving notification from a user, another display program or a problem notification program (steps 808, 810, 812, 814).

The type of notification from the user is classified into a confirm notification and a release notification.

The confirm notification indicates a line 906 for which "communication possible" is set in the problem information window of FIG. 9, and it is generated when a "confirm" 908 button is pushed. When receiving this notification (step 808), the display program deletes the entry corresponding to the indicated line from the display table (step 809).

The release notification is made by the user when it is unnecessary to monitor the problem status, and it is generated when the user indicates a line for which "communication impossible" is set in the problem information window and pushes a "release" button. Upon receiving this notification (step 810), the display program issues a monitor end notification to the problem notification program 122 of the problem notification program identifier of.the entry of the display table corresponding to the indicated line together with the transmission destination terminal and the identifier of the display program at the transmission destination which are contained in the entry corresponding to the indicated line, and deletes this entry from the display table (step 811).

On the other hand, upon receiving the monitor end notification (step 415 of FIG. 4), the entry containing the transmission destination terminal indicated by the monitor end notification and the identifier of the display program making the monitor end notification is deleted from the notification table (step 416 of FIG. 4).

Next, the notification which the display program receives from another display program is the request notification as described above.

Upon receiving the request notification (step 812), the display program creates, in the display table, information containing the problem notification program identifier, the transmission destination terminal to be displayed on the problem information window, the status, the time, the comment, etc. on the basis of the information contained in the notification information (step 813).

Next, the notification from the problem notification program 122 is classified into status information and notification information.

Upon receiving the status information or the notification information (step 814), the display program changes the content of the display table according to the content thereof, and changes the displays of the problem information window on the basis of the changed content of the display table (step 815). The notification information is divided into information which is based on the status change notification from the network management system 10 and common to all the entries in which the problem notification program notifying the notification information is registered, and information which is individual to each transmission terminal and is based on the status notification to a specific transmission destination terminal from the problem notification program moving to the network device 20 just before the transmission destination terminal.

The display program repetitively performs these processing steps as far as any item exists in the display table (step 816).

The description on the first embodiment of the present invention has been completed.

As described above, according to the above embodiment, the problem notification program 122 which moves to the network device 20 automatically notifies problem information to a transmission destination of data which are to be passed through a place experiencing problem. Further, the problem notification program 122 detects restoration of communication with a transmission destination terminal or a problem of the transmission destination terminal itself, and then notifies it to a transmission source.

Accordingly, by merely generating a problem notification program 122 and moving it to a network device adjacent to a problem place, the network management system 10 can notify information about the occurrence of a problem and restoration of a problem to all the users which are going to communicate with the place experiencing the problem.

When another display program exists on a terminal 30, the display program which is generated to present the problem to the user and moved to the terminal 30 requests the other display program to perform the processing in place of the display program concerned. Accordingly, the processing load of the terminal 30 to present the problem information to the user is not so large.

Next, a second embodiment according to the network system of the present invention will be described in the following.

Figure 11:
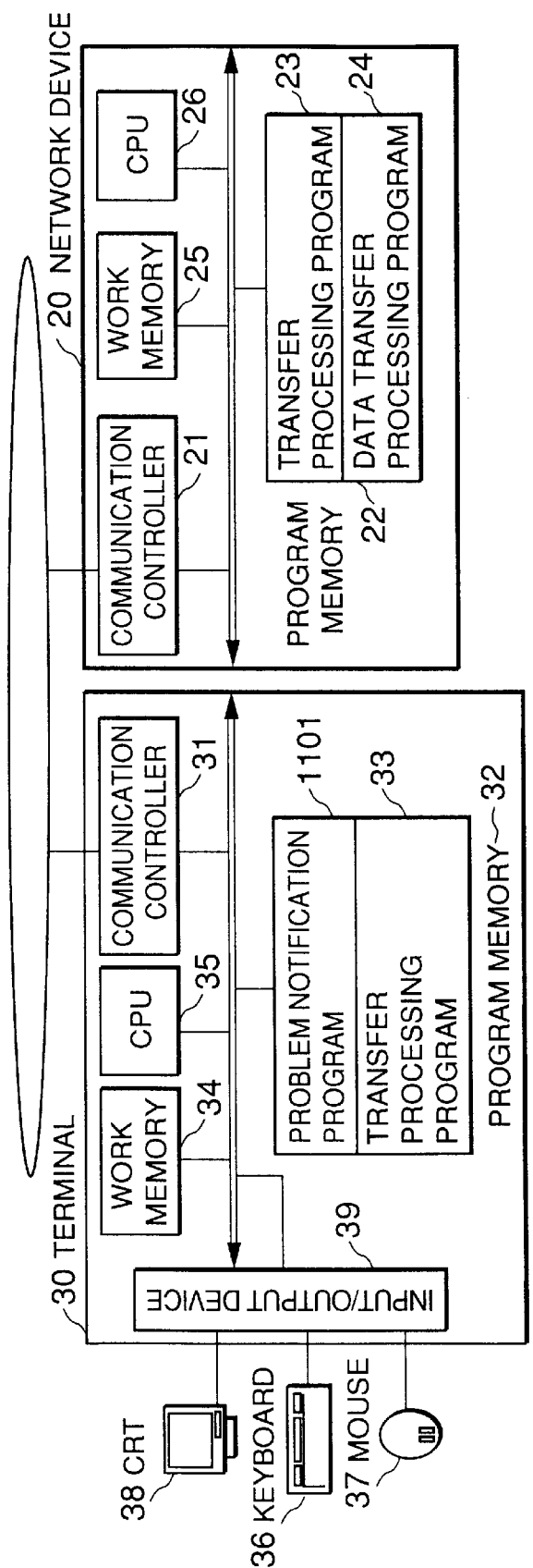
FIG. 11 is a block diagram showing the construction of each device of a network system according to a second embodiment of the present invention.

FIG. 11 shows the construction of the network system according to the second embodiment of the present invention.

As shown in FIG. 11, the network system according to the second embodiment comprises network devices 20 and terminals 30.

The internal construction of each network device 20 is the same as the network device of the first embodiment. Further, each terminal 30 is designed so that a problem notification program 1101 is added in a program memory 32 in the construction of the terminal of the first embodiment.

Next, the operation of the network system according to the second embodiment will be described sequentially using a processing flow on a time basis.

As in the case of the first embodiment, a problem notifying method is first set on the terminal 30.

Figure 12:
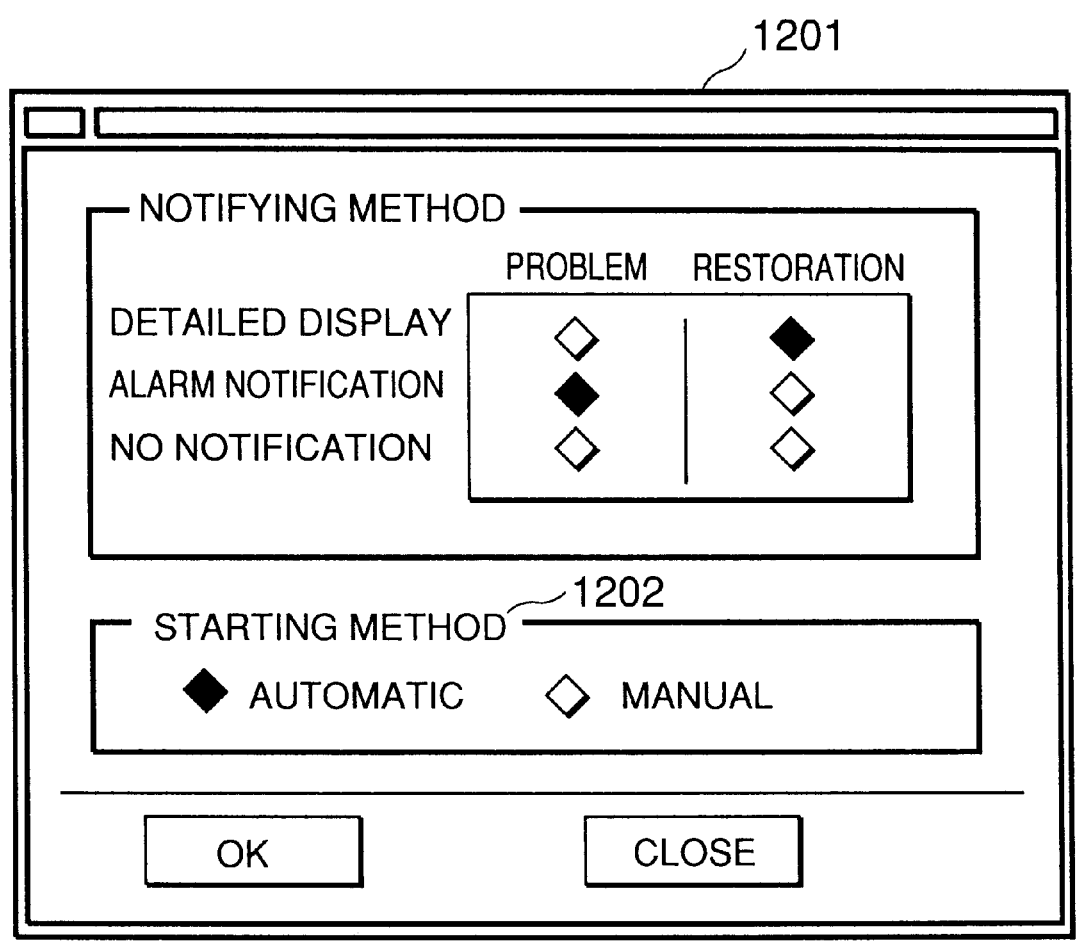
FIG. 12 is a diagram showing a setting window according to the second embodiment of the present invention.

In the second embodiment, a setting window 1201 shown in FIG. 12 is used. The setting window of FIG. 12 is substantially the same as the setting window according to the first embodiment shown in FIG. 3, however, it is added with an item 1202 for a starting method of setting whether an analysis notification should be dynamically made at the time when a problem occurs. The setting content on the setting window is stored as a local file on the terminal 30.

Next, the processing carried out by the problem notification program 1101 will be described. Here, the processing carried out by the problem notification program 1101 means the processing carried out by a process whose processing is defined in the problem notification program 1101.

Figure 13:
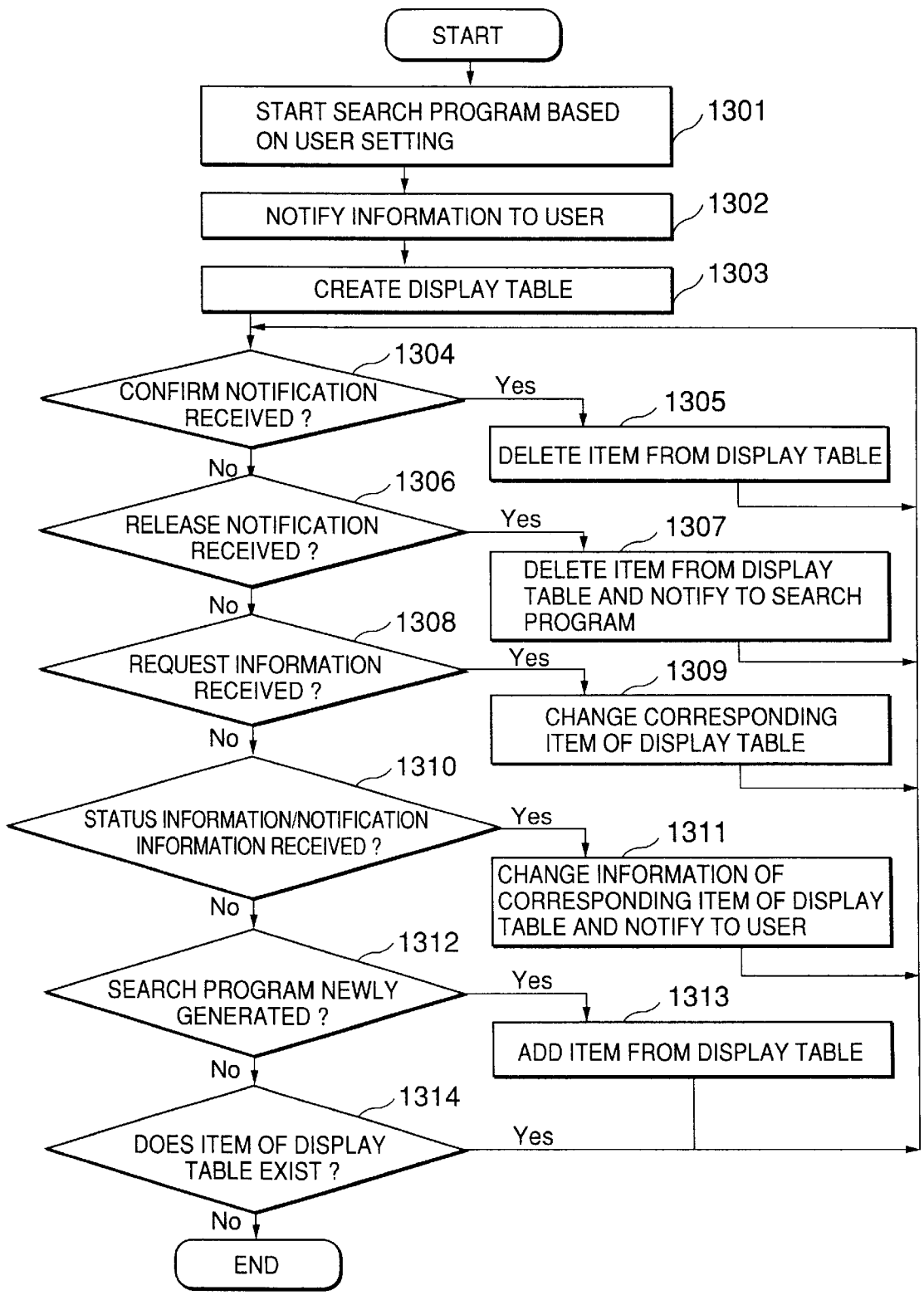
FIG. 13 is a flowchart showing the processing of a problem notification program according to the second embodiment of the present invention.

FIG. 13 shows the processing carried out by the problem notification program 1101.

The problem notification program 1101 generates a search program as an agent on the basis of the set item of the starting method set on the setting window (step 1301). That is, when the set item of the starting method is automatic start, the problem notifying program 1101 monitors a transmission error notification from a communication controller or another program. When receiving the transmission error notification, the problem notifying program 1101 generates a search program, and notifies the search program thus generated of a transmission destination terminal in which a transmission error indicated by the transmission error notification occurs, and the identifier of the search program. Further, when the set item of the starting method is manual start, the problem notifying program 1101 generates the search program in response to a user's request, and notifies the search program thus generated of the transmission destination terminal indicated by the user, the identifier of the search program and the identifier of the problem notification program.

Figures 14, 15:
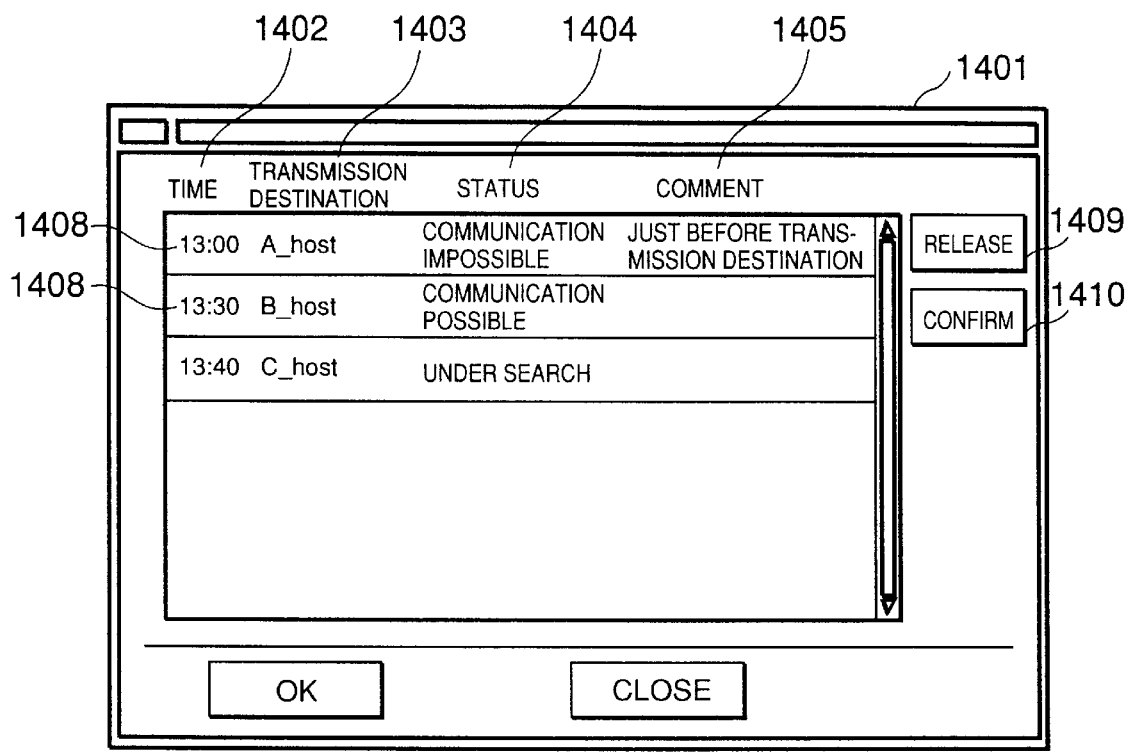
FIG. 14 is a diagram showing a problem notifying window according to the second embodiment of the present invention.
FIG. 15 is a diagram showing the construction of a display table according to the second embodiment of the present invention.

Thereafter, the problem notification program 1101 displays the problem notification window shown in FIG. 14 on a display frame to notify a search status to the user (step 1302).

Information is displayed for every transmission destination terminal in the problem notification window 1401 of FIG. 14. The transmission destination terminal 1403 represents the transmission destination of the transmission data error notification received by the problem notification program or the transmission destination terminal indicated by the user. The time 1402 represents the time at which the problem notification program 1101 receives the first transmission error notification with respect to the corresponding transmission destination terminal, or the time at which the search request is received from the user. The status 1404 displays the following three kinds of information, that is, "under search" indicating such a situation that the notification of the status information has not been returned from the search program notifying the corresponding transmission destination terminal, and "communication possible" and "communication impossible" each of which is indicated by the status information notified from the search program which notifies the corresponding transmission destination terminal. The comment 1405 displays the notification information which is notified on the basis of the search result of the search program.

Further, the problem notification program 1101 creates the display table together with the display of the problem notification window (step 1303).

FIG. 15 shows the construction of the display table 1501. An entry is created in the display table 1501 every time a search program is generated. The search program identifier 1502 of each entry is an identifier given to a search program generated by the problem notification program 1101. The transmission destination terminal 1503 stores the transmission destination terminal notified to the search program, and stores, in status 1504, comment 1506 and time 1505, the contents which are to be displayed as the status 1404, the comment 1405 and the time 1402. Here, each entry is provided in association with each line of the problem notification window 1401.

The problem notification program 1101 performs the following operation in response to the request from the user, the status information from the search program or the notification of the notification information.

The request from the user includes a confirm notification or a release notification. The confirm notification indicates a line 1407 for which "communication possible" is set in the problem notification window 1401, and it is generated when a "confirm" button 1410 on the window is pressed. Upon receiving this notification (step 1304), the problem notification program 1101 deletes the corresponding entry on the display table (step 1305).

The release notification is generated when the user assigns a line 1408 for which "communication impossible" is set on the problem notification window and presses a "release" button 1409. Upon receiving this notification (step 1306), the display program transmits a monitor end notification to the search program of the search program identifier registered in the entry of the display table corresponding to the indicated line on the display table together with the information of the transmission destination terminal registered in the entry of the display table corresponding to the indicated line, and deletes this entry on the display table (step 1307).

When a new search program is generated (step 1312), an entry for the new search program is added into the display table (step 1313).

The problem notification program 1101 repeats the above processing until the processing on all the items of the display table is completed (step 1314).

Next, the operation of the problem notification program 1101 when request information 1308, status information and notification information 1310 are received from the search program will be described together with the operation of the search program.

Figure 16:
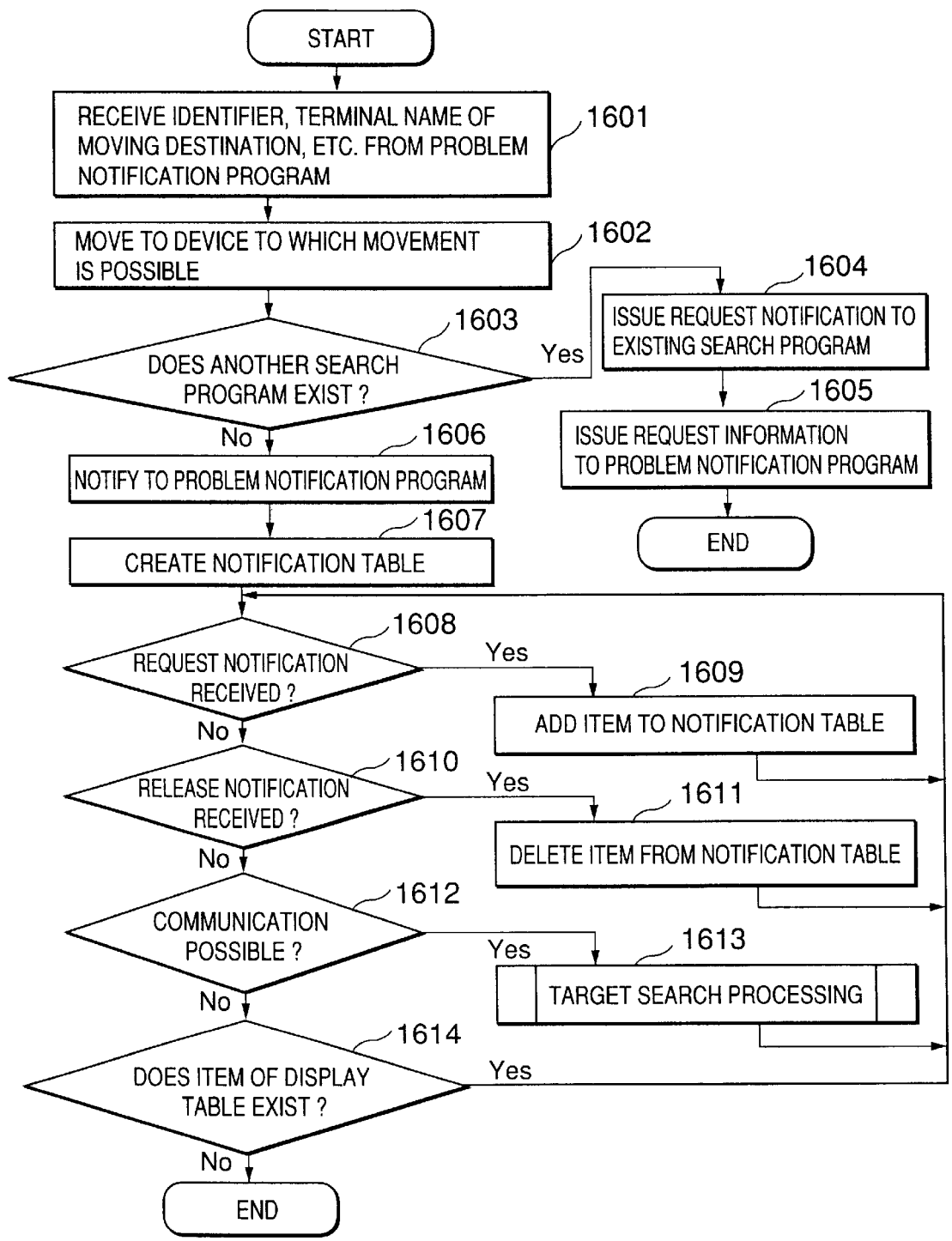
FIG. 16 is a flowchart showing the processing of a search program according to the second embodiment of the present invention.

FIG. 16 is a diagram showing the operation of the search program. Here, the operation of the search program is an operation carried out by an agent defined by the search program.

The search program thus generated attempts to move to a network device 20 which is directly connected to the terminal 30 generated thereon (step 1601). If the search program is movable, it moves onto the network device 20. Thereafter, it collects the input/output relationship on the network device 20 to which the search program moves, and checks which output port is used by the data to the transmission destination terminal notified from the problem notification program 1101. The search program judges whether it is possible to move to a subsequent device connected to the output port thus detected (step 1602). If it is not possible to move the next device, it judges whether another search program which exists monitors the output port thus detected (step 1603). If any search program exists, the identifier of the problem notification program notified from the problem notification program 1101, the identifier of the search program and the transmission destination terminal are notified as a request notification to the other search program (step 1604), and the identifier of the other search program to which the request notification is transmitted and the identifier of the search program itself are notified as request information to the problem notification program of the identifier of the problem notification program notified from the problem notification program 1101, thereby completing the processing (step 1605). Upon receiving the request information (step 1308 of FIG. 13), the problem notification program 1101 changes the identifier of the search program transmitting the request information to the identifier of the other search program indicated by the request information (step 1309 of FIG. 13).

If no other search program exists, the search program notifies the status information of "communication impossible" to the problem notification program 1101, and stays on the network device 20 thereof to monitor the output port which is used by the data to be transmitted to the transmission destination terminal (step 1606).

Upon receiving the status information (step 1310 of FIG. 13), the problem notification program 1101 changes the status of the entry of the display table in which the identifier of the search program transmitting the status information is registered to "communication impossible", and also changes the display of the problem notification window in association with the above change of the status of the entry (step 1311 of FIG. 13).

The search program creates and holds a notification table having an entry comprising the identifier of the problem notification program notified from the problem notification program 1101 and the transmission destination terminal (step 1607).

The search program performs the following operation when receiving a request notification from another search program or a notification from a problem notification program, or when the output port under monitor is changed to "communication possible".

First, upon receiving a request notification from another search program (step 1608), the search program adds an entry in which the identifier of the problem notification program received from the search program transmitting the notification and the transmission destination terminal are registered therein to the notification table, and notifies "communication impossible" as status information to the problem notification program of the identifier of the problem notification program thus received (step 1609).

The notification from the problem notification program 1101 is a monitor end notification. Upon receiving this notification (step 1610), the search program deletes from the notification table the entry in which the identifier of the problem notification program transmitting the monitor end notification and the transmission destination terminal contained in the monitor end notification are registered (step 1611).

Next, the target search processing is carried out (step 1613) when the search program is movable from the output port under monitor to the next network device (step 1612).

Figure 17:
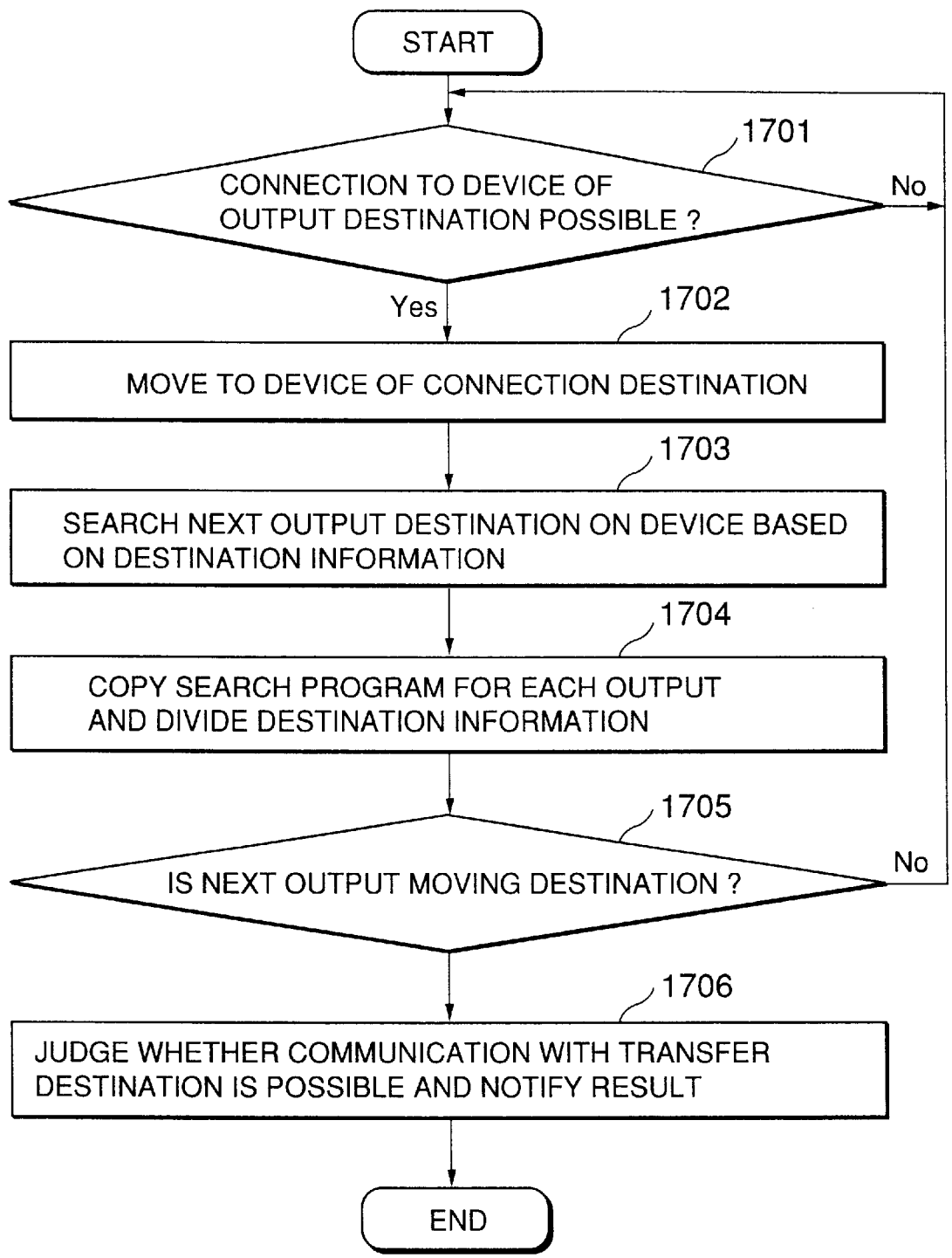
FIG. 17 is a flowchart showing the target search processing of the search program according to the second embodiment of the present invention.

FIG. 17 shows the procedure of the target search processing.

In this processing, the search program attempts to move to the network device which is directly connected to the output port under monitor (step 1701). If it is movable, it moves onto the network device 20 thereof while accompanying the notification table comprising the entry of the transmission destination terminal to which the communication is impossible (step 1702). Thereafter, the search program checks the input/output relationship of the network device 20 of the moving destination to judge which output port is used by the transmission destination terminal contained in the notification table (step 1703). At this time, when the output ports are different in accordance with the transmission destination terminal, the search program is copied to each output port (step 1704). Each search program thus copied holds a notification table, and the notification table at this time holds only the entry of the transmission destination terminal using respective output ports.

Each search program judges whether it is movable to the next network device 20 of the corresponding output port. If it is movable, it moves to the next network device 20 to perform the same processing as described above in the network device of the moving destination (step 1705). The search program which has arrived at the network device 20 just before the transmission destination terminal registered in the notification table checks whether it can communicate with the transmission destination terminal. If the communication is impossible, the search program sends notification information to the problem notification program 1101 having the identifier registered in the entry of the transmission destination terminal indicating that the transmission destination terminal itself may possibly have a problem. If the communication is possible, the search program notifies it as notification information to the problem notification program 1101 having the identifier registered in the entry of the transmission destination terminal that the communication is possible, and then the processing is finished (step 1706).

The description on the second embodiment has been completed.

As described above, according to the second embodiment of the present invention, the search program generated by the problem notification program 1101 on the terminal 30 is moved to the network device 20 adjacent to a place experiencing a problem to automatically notify the problem information to the transmission destination of data which are to be passed through the place having a problem. The search program detects the restoration of the communication with the transmission destination terminal or the problem of the transmission destination terminal itself, and notifies the detection result to the transmission source.

Accordingly, even when no network management system 10 exists, information on the occurrence of problems and restoration of problems can be notified to all the users wishing to perform communications made through places with a problem.

Further, when another search program exists on the terminal 30, the search program requests the other search program to perform the processing in place of the search program concerned. Therefore, the processing load of the network system can be reduced to be less than the case where no request for substitute execution is made.

Next, a third embodiment according to the present invention will be described.

Figure 18:
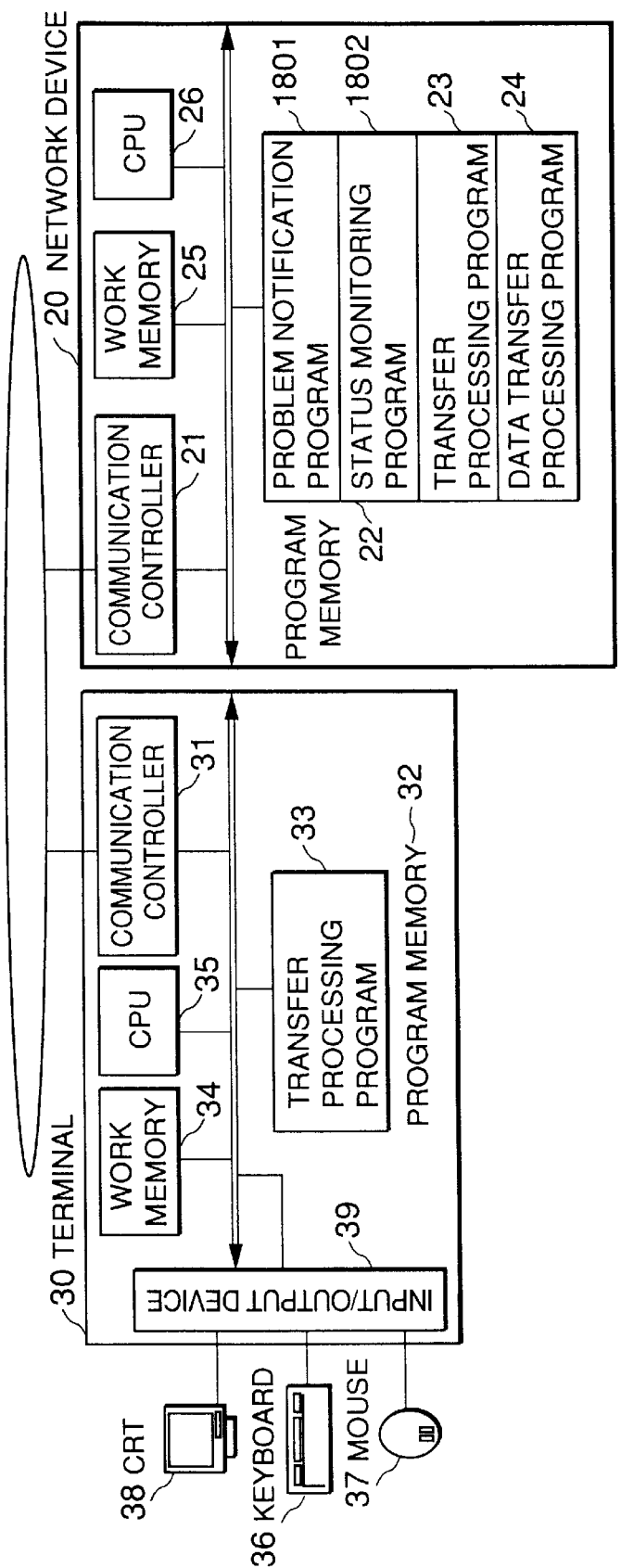
FIG. 18 is a block diagram showing the construction of each device constituting a network system according to a third embodiment of the present invention.

FIG. 18 shows the construction of a network system according to a third embodiment of the present invention.

As shown in FIG. 18, the network system of the third embodiment comprises network devices 20 and terminals 30.

The internal construction of the network device 20 is designed so that a problem notification program 1801 and a status monitor program 1802 are added to a program memory 22 in the network device of the second embodiment. The internal construction of the terminal 30 is designed so that the problem notification program 1101 in the program memory 32 of the terminal 30 of the second embodiment is omitted.

Next, the operation of the network system of the present embodiment will be described.

First, the problem information notifying method is set on the terminal 30. This setting processing is the same as the processing using the setting window 301 of FIG. 3 in the first embodiment.

Next, the operation of the status monitoring program 1802 on the network device 20 will be described. Here, the operation of the status monitoring program 1802 means the operation of the process which performs the processing defined by the status monitor program 1802.

The status monitoring program 1802 periodically monitors transfer errors of data transmitted from the respective output ports of the network devices 20, and if an error exceeds a predetermined threshold value, the status monitoring program 1802 checks whether it can communicate with the status monitoring program of a network device which is directly connected to an output port having the error exceeding the predetermined threshold value. If the communication is impossible, the problem notification program 1801 is started as an agent.

Next, the operation of the problem notification program 1801 started by the status monitoring program 1802 will be described. Here, the operation of the problem notification program 1801 means the operation of an agent defined by the problem notification program 1801.

The operation of the problem notification program 1801 is the same as the operation of the problem notification program 122 after it moves onto the network device 20 indicated by the administrator in the first embodiment. However, in the third embodiment, no status information and no assignment of an output port are received from the administrator. The problem notification program 1801 according to the third embodiment selects as an output port being monitored an output port which causes activation of the problem notification program 1801 because the transmission error exceeds the predetermined threshold value. Information which is available in the network device 20 is used as the notification information. For example, if information on periodic maintenance is set in the network device 20 in advance, the fact that the network device 20 is under periodic maintenance is used as notification information. Further, the same processing as carried out when the restoration notification is received in the first embodiment is carried out, not at the time when the restoration notification is received from the network management system 10, but at the time when the communication with the status monitoring program 1802 of the network device 20 directly connected to the output port becomes possible.

The operation of the problem notification program and the operation of the display program generated by the problem notification program are the same as the first embodiment.

The description of the third embodiment of the present invention has been completed.

As described above, according to the third embodiment, the same effect as the first embodiment can be achieved without using the network management system.

Next, a fourth embodiment of the present invention will be described.

Figure 19:
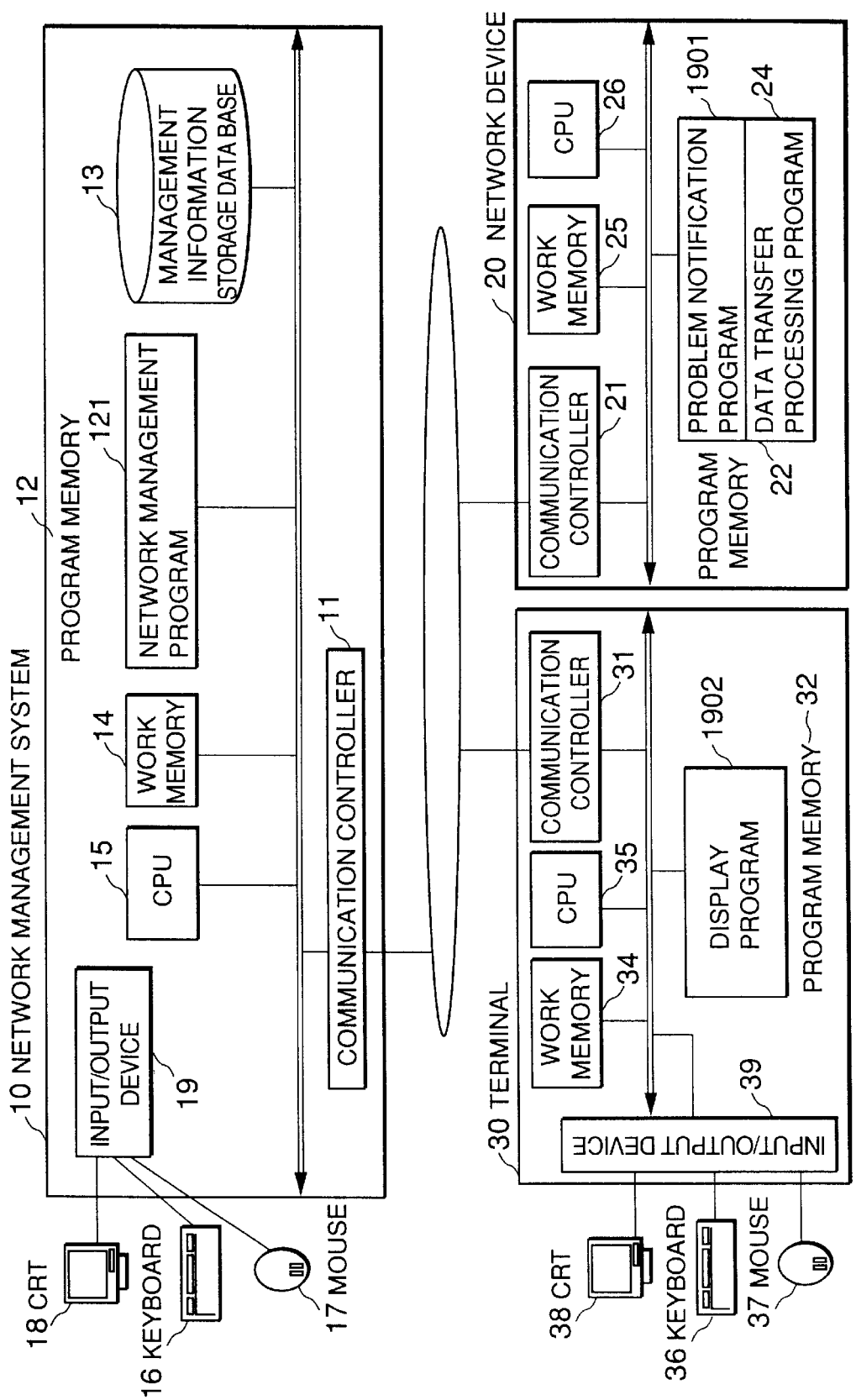
FIG. 19 is a block diagram showing the construction of each device constituting a network system according to a fourth embodiment of the present invention.

FIG. 19 shows the construction of a network system according to the fourth embodiment of the present invention.

As shown in FIG. 19, the network system of the fourth embodiment comprises a network management system 10, network devices 20 and terminals 30.

In the forth embodiment, a problem notification program 1901 and a data transfer processing program 24 are stored in the program memory 22 of the network device 20. Further, a display program 1902 is stored in the program memory 32 of the terminal 30, and a network management program 121 is stored in the network management system 10.

The operation of the network system will be described in the following.

First, the operation of the problem notification program on the network device 20 will be described. Here, the operation of the problem notification program 1901 means the operation of the process which performs the processing defined by the problem notification program 1901.

Figure 20:
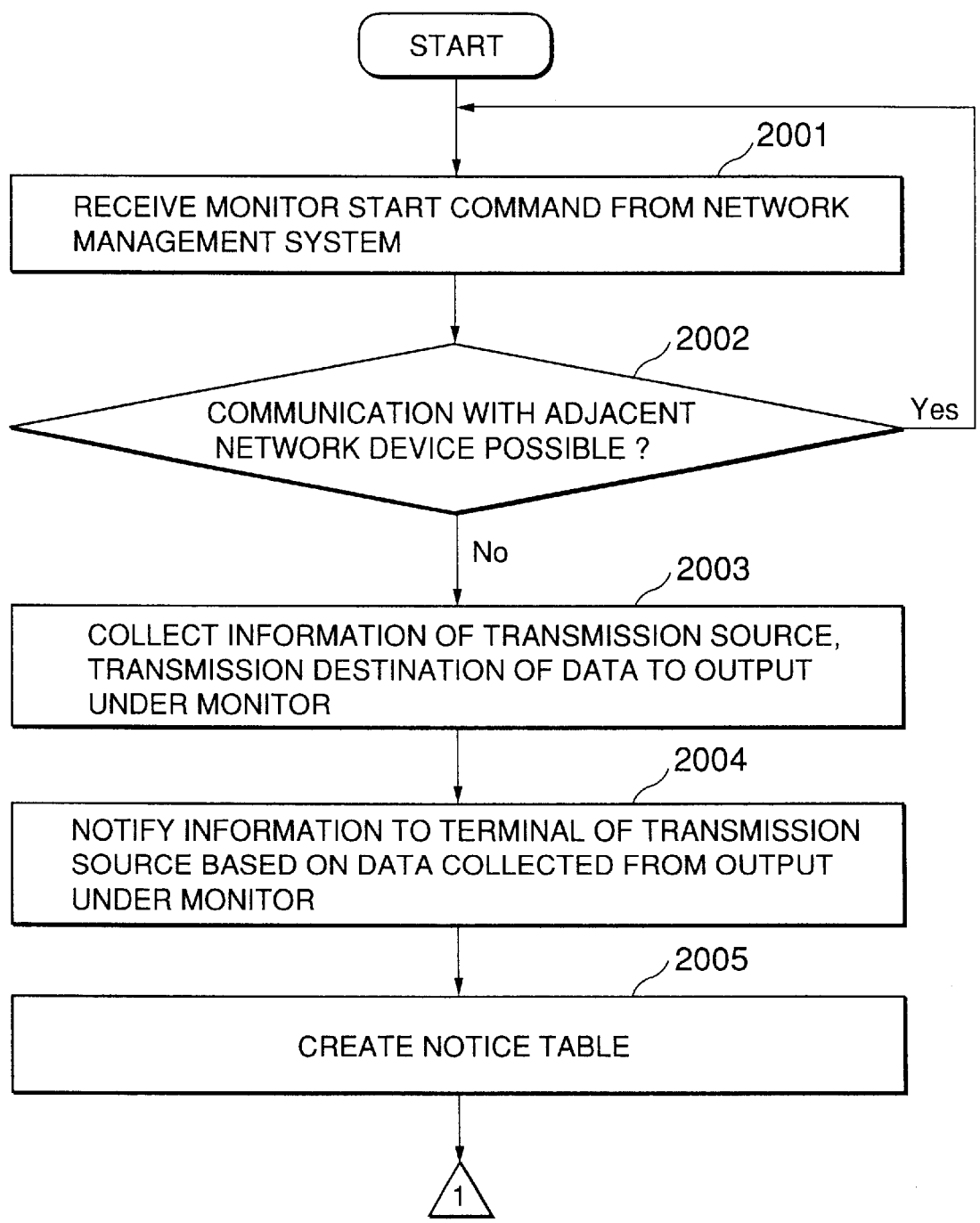
FIG. 20 is a flowchart showing the processing of the problem notification program according to the fourth embodiment of the present invention.
Figure 21:
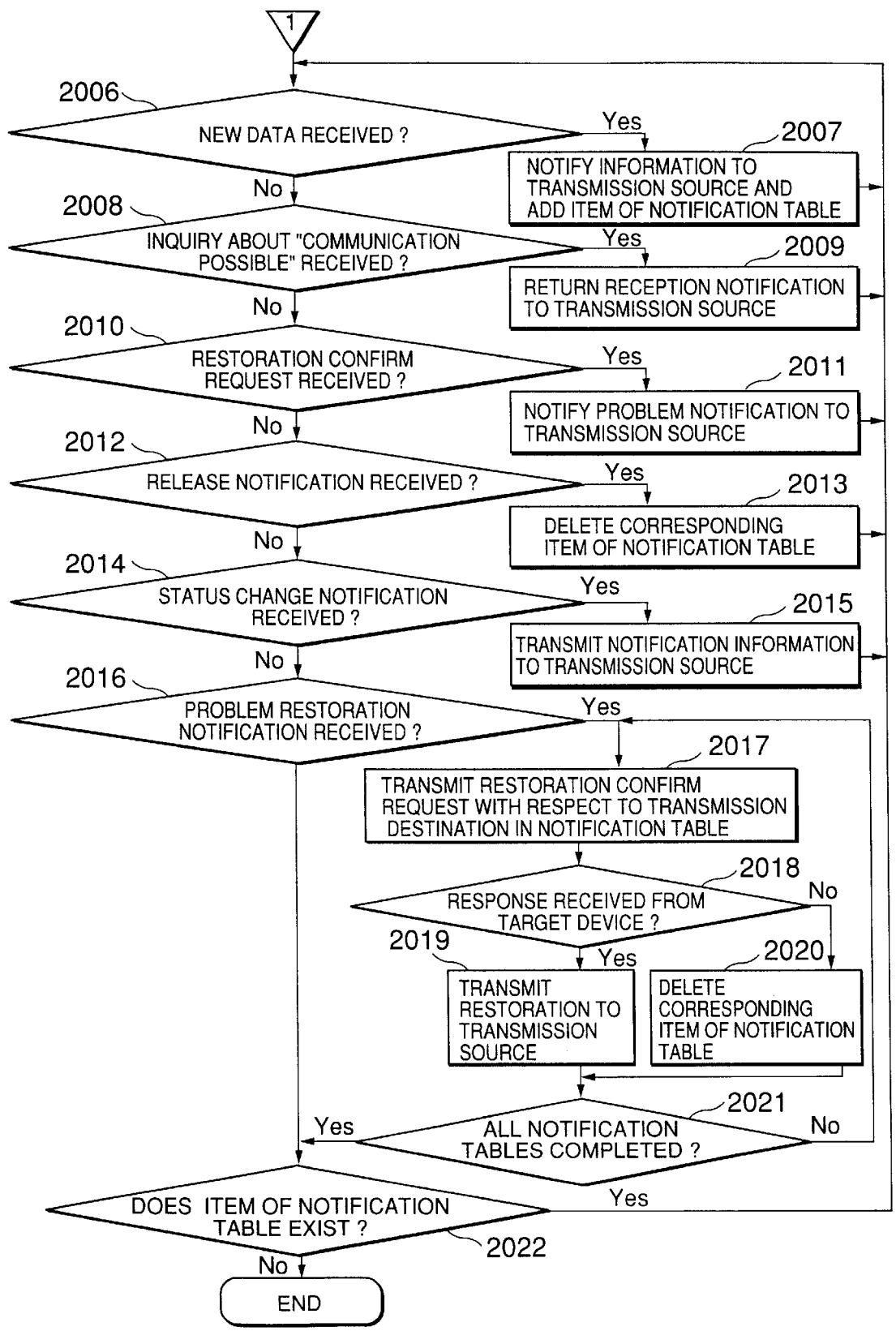
FIG. 21 is a flowchart showing the processing of a problem notification program according to the fourth embodiment of the present invention.

As shown in FIGS. 20 and 21, upon receiving a monitor start command from the network management system 10, the problem notification program 1901 monitors an output port indicated by the monitor start command to monitor the data flowing in the output port (step 2001). As in the case of the third embodiment, the start of the monitoring of the output port may be performed under self-control without the network management system by monitoring the status of the transfer error on the network device 20 and making the problem notification program start the monitor of a specific output port on the basis of the monitoring result.

Upon receiving the start command, the problem notification program 1901 inquires of the problem notification program 1901 on a network device 20 directly connected to the indicated output port about whether the communication is possible (step 2002). As a result, if there is no response to the inquiry, analysis of data to be transmitted to the output port under monitor is started (step 2003).

The problem notification program 1901 detects the transmission source and the transmission destination of data flowing into the output port being monitored, transmits a problem notification to the data transmission source containing status information indicating that the communication with the data transmission destination is impossible (step 2004), and creates a notification table (step 2005).

FIG. 22 shows the construction of the notification table thus created.

As shown in FIG. 22, each entry in the problem notification table 2201 comprises a notification identifier 2202 for identifying the status information notified to the data transmission source, a transmission source terminal 2203 representing the data transmission source and a transmission destination terminal 2204 representing the data transmission destination.

The problem notification program 1901 performs the following processing according to the monitor result of the output port, the display program 1902, the problem notification programs 1901 of the other network devices 20 and the notification from the network management system 10.

First, if new data is transferred to the output port under monitor (step 2006 of FIG. 21), the data is analyzed, the status information, the notification identifier, the transmission destination and the network device 20 in which the problem notification program 1901 exists are notified to the transmission source, and the entry is added to the notification table (step 2007) in the same manner as described above.

An inquiry about whether the communication is possible and a restoration confirmation notification are provided as notification from the problem notification program 1901 of another network device 20.

When the inquiry about whether the communication is possible is received (step 2008), a reception notification is issued to notify the reception of the inquiry to the problem notification program transmitting the inquiry (step 2009).

The processing when the restoration confirmation notification is received will be described later.

A release notification is provided as the notification from the display program 1902. The processing when the release notification is received will also be described later.

The notification from the network management system 10 is classified into a status change notification and a restoration notification.

When receiving the status change notification (step 2014), the problem notification program 1901 transmits it as notification information to the data transmission source on the basis of the notification table (step 2015).

When the problem restoration notification is received (step 2016), the monitoring of the output port is stopped, and the restoration confirm notification is transmitted to each transmission destination registered in the notification table (step 2017). For example, as in the case of the third embodiment, the operation may also be performed under self-control without the network management system, by transmitting the restoration confirm notification or the like at the time communication with the problem notification program of the network device connected to the output port being monitored is possible.

The restoration confirm notification contains information of the entry in which the transmission destination of the notification table is registered. When a response to this notification is returned (step 2018), it is judged that the communication with the transmission destination is possible, and the status information representing "communication possible" is transmitted to the corresponding transmission source (step 2019).

When the problem notification program 1901 of another network device 20 on the route from the network device 20 transmitting the restoration confirm notification to the transmission destination monitors the output port to which the restoration confirm notification flows, this restoration confirm notification is received by the problem notification program 1901 which monitors the output port. In this case, the problem notification program 1901 receiving the restoration confirm notification (step 2010) transmits to the problem notification program of the transmission source thereof a problem notification containing the identifier thereof and the notification information which was previously received from the network management system 10 (step 2011), and adds the entries of the notification table with an entry which is transmitted together with the restoration confirm notification. When receiving a problem notification as a response to the restoration confirm notification (step 2016), the problem notification program 1901 serving as the transmission source of the restoration notification transmits a notification request containing the identifier of the problem notification program 1901 issuing the problem notification and the received notification information to the transmission source registered in the same entry of the notification table as the transmission destination which transmitted the restoration confirm notification together with the transmission destination which transmits the notification identifier of the notification request and the restoration confirm notification, and deletes the entry (steps 2017, 2018, 2019).

Next, the operation of the display program 1902 on the terminal 30 will be described. Here, the operation of the display program means the operation of the process which performs the processing defined by the display program.

Figure 23:
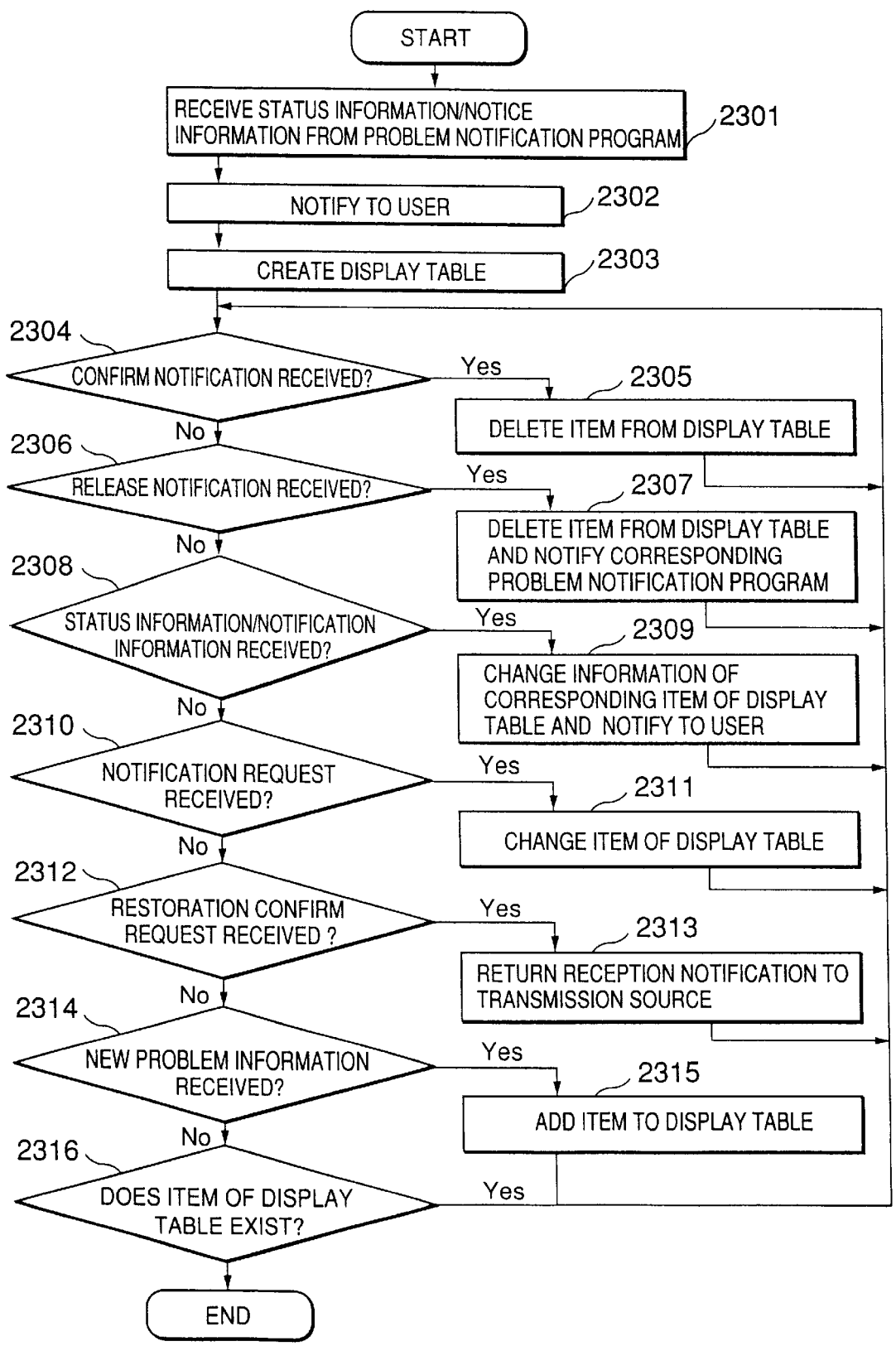
FIG. 23 is a flowchart showing the processing of a display program according to the fourth embodiment of the present invention.

FIG. 23 shows the procedure of the processing carried out by the display program 1902.

Upon receiving the status information (step 2301), the display program 1902 on the terminal 30 displays the transmission destination of the data indicated by the status information, status information received, notification information, time, etc. using a window similar to the problem notification window of the first embodiment to notify these information to the user (step 2302), and creates a display table.

FIG. 24 shows the construction of the display table.

As shown in FIG. 24, the problem notification program identifier 2402 of each entry of the display table 2401 is used to identify the network device notifying the status information. The notification identifier 2403 represents the notification identifier of the status information which is notified together with the received status information. The status 2405 represents the received status information, and the time 2406 represents the time which is contained in the status information and at which the status information occurs. The comment represents the notification information notified.

The display program 1902 performs the following processing in accordance with the notification from the user and the notification from the problem notification program 1901 on the network device 20.

The notification from the user is classified into a release notification and a confirm notification as in the case of the first embodiment.

Upon receiving the confirm notification (step 2304), the display program 1902 deletes the entry of the display table which is indicated by the confirm notification (step 2305). Upon receiving the release notification (step 2306), the display program 1902 transmits a release notification for the transmission destination registered in the entry of the display table which is indicated by the release notification, to the problem notification program 1901 of the problem notification program identifier registered in the entry, and deletes this entry from the display table (step 2307).

Here, upon receiving the release notification (step 2012 of FIG. 21), the problem notification program deletes the entry of the notification table in which the transmission destination indicated by the release notification is registered (step 2013 of FIG. 21).

Upon receiving the status information or the notification information from the problem notification program 1901 (step 2308), the display program 1902 changes the status and the comment of the entry of the display table in which the transmission destination indicated by the status information is registered, to the contents notified with the status information and the notification information, and according to the changed contents, the display of the problem notification window is updated, whereby the contents notified with the status information and the notification information are notified to the user (step 2309).

When receiving the notification request (step 2310), the display program updates the problem notification program identifier, of the entry having the transmission destination indicated by the notification request, to the problem notification program identifier contained in the notification request, updates the comment of the entry according to the notification information contained in the notification request, and updates the notification identifier of the entry to the notification identifier of the notification request (step 2311).

Upon receiving the restoration confirm notification (step 2312), the display program 1902 issues a reception notification to the network device of the transmission source (step 2313). Further, upon receiving the status information on a transmission destination which is not registered in the display table (step 2314), it adds the entry thereof into the display table (step 2315).

The description of the fourth embodiment of the present invention has been completed.

As described above, according to the fourth embodiment using no moving program, the same effect as the first embodiment can be achieved even in a network system which does not have an environment for supporting moving agents.

The present invention is not limited to the above embodiments, and various modifications may be made without departing from the subject matter of the present invention. For example, the various programs stored in the program memories in the network management system, the network devices and the terminals may be supplied from storage media such as CD-ROM's or the like. In this case, a drive device for a removable storage medium such as a CD-ROM drive or the like is provided in each of the network management system, the network devices and the terminals, and various programs stored in the storage medium are read out and are stored in a program memory by the drive device.

As described above, according to the present invention, the load of the network administrator can be reduced, and when a problem occurs in a communication carried out by a user, the information on the problem can be properly presented to the user. In addition, the processing load in the network management system which must be carried out to present the problem information to the user can be reduced.

What is claimed is:

1. A network system having a plurality of terminal devices and a plurality of network devices for relaying data among said terminal devices, said terminal devices being used by users of said network system, wherein each network devices includes:

first means for detecting a problem in said network device;

second means for detecting a terminal device which is a transmission source of data output to an output port of said network device in which said problem has occurred; and means for notifying problem information representing occurrence of said problem in said network device to said terminal device which is the transmission source of data output to said output port detected by said second means for detecting, thereby informing the user of said terminal device of said problem.

2. A network system having a plurality of terminal devices, a plurality of network devices for relaying data among said terminal devices and a network management system for managing said network, wherein:

said network management system includes:

means for generating a problem notification agent which is movable among devices and whose first moving destination is indicated, and means for assigning an output port to be monitored to the agent thus generated, wherein the problem notification agent moved to the network device thus indicated:

detects a terminal device serving as a transmission source of data output from the output port under monitor which is indicated by the network device concerned; and notifies problem information representing occurrence of the problem to the terminal device serving as the transmission source thus detected.

3. The network system as claimed in claim 2, wherein said network management system includes means for notifying information to be notified to a user to the problem notification agent moved to the indicated network device; and the problem notification agent moved to the indicated network device notifies the information notified from said management system as problem information to the terminal device of the transmission source detected.

4. The network system as claimed in claim 2, wherein said problem notification agent:

detects both a terminal device of a transmission source of the data and a terminal device of a transmission destination;

detects whether the communication with the terminal device of the transmission destination thus detected is possible; and notifies restoration of the problem to the terminal device of the transmission source when the communication with the terminal device of the transmission destination is possible.

5. The network system as claimed in claim 2, wherein said problem notification agent of said network device detects the terminal device of the transmission source of the data and the terminal device of the transmission destination; successively moves among network devices along a route directing to the terminal device of the transmission destination of the data while waiting until the movement is possible after notifying problem information representing occurrence of a problem in the terminal device of the transmission source thus detected; checks whether the communication is possible between the terminal device of the transmission destination of the data concerned and the network device just before the terminal device of the transmission destination of the data concerned when the next moving destination is the terminal device of the transmission destination of the data concerned; and notifies the check result as problem information to the terminal device of the transmission source of data concerned.

6. The network system as claimed in claim 2, wherein said problem notification agent generates a present agent which moves to the terminal device of the transmission source thus detected before or simultaneously with the notification of the first problem information to the terminal device of the transmission source, and said present agent presents the problem information notified to the terminal device concerned from the problem notification agent which generates the present agent concerned.

7. The network system as claimed in claim 6, wherein when a present agent (second present agent) is moved onto a terminal device in which another present agent (first present agent) already exists, said second present agent requests said first present agent to perform the processing which would be performed by said second present agent if said first present agent did not exist, and said first present agent performs the processing requested by said second present agent.

8. A network system having a plurality of terminal devices and a plurality of network devices for relaying data among said terminal devices, said terminal devices being used by users of said network system, wherein each network device includes:

status monitoring means for detecting a terminal device which is a transmission source of data output from an output port in which a problem has occurred, and generating a problem reception agent in said terminal device which is the transmission source of data output to said output port, said problem reception agent receiving problem information representing the occurrence of the problem from said network device.

9. A network system comprising a plurality of terminal devices and a plurality of network devices for relaying data among said terminal devices, wherein: each of said terminal devices includes problem notification means for generating a search agent which successively moves among network devices on a route directing to a terminal device of a transmission destination of data for which a problem is recognized, and when said search agent cannot move to a next network device on the route directing to the terminal device of the transmission destination of the data concerned, said search agent notifies occurrence of the problem to the terminal device concerned.

10. The network system as claimed in claim 9, wherein after notifying problem information representing occurrence of the problem to the terminal device of the transmission source detected, said search agent successively moves among network devices along the route directing to the terminal device of the transmission destination of the data while waiting until said search agent is movable, and when the next moving destination is the terminal device of the transmission destination of the data, said search agent checks whether the communication is possible between the terminal device of the transmission destination of the data concerned and the network device just before the terminal device of the transmission destination of the data concerned, and notifies the check result to the terminal device having the problem notification means creating the search agent concerned.

11. The network system as claimed in claim 9, wherein when a search agent (second search agent) is moved onto a terminal device in which another search agent (first search agent) already exists, said second search agent requests said first search agent to perform the processing which would be performed by said second search agent if said first search agent did not exist, and said first search agent performs the processing requested by said second search agent.

12. A network system including a plurality of terminal devices and a plurality of network devices for relaying data among said terminal devices, wherein each of said network devices has problem notifying means, and wherein said problem notifying means of each network device:

exchanges a message with problem notifying means of another network device which is directly connected to the network device concerned;

analyzes data output from an output port connected to the other network device to detect a terminal device of a transmission source of the data concerned when a problem occurs in the exchange of the message;

notifies problem information representing occurrence of the problem to the terminal device of the transmission source thus detected;

checks, by exchanging a message with a terminal device of a transmission destination of the data, whether communications with the terminal device of the transmission destination of the data are possible after the problem information representing the occurrence of the problem is notified to the terminal device of the transmission source detected; and notifies restoration of the problem to the terminal device of the transmission source detected if the communications are possible.

13. A method of notifying problem information to a terminal device in a network system comprising a plurality of terminal devices and a plurality of network devices for relaying data among said terminal devices, said terminal devices being used by users of said network system, in each network device the method comprising the steps of:

analyzing data output from an output port in which a problem occurs, first detecting a problem in said network device and second detecting a terminal device which is a transmission source of the data output to an output port of said network device in which said problem has occurred based on the data analysis; and notifying problem information representing occurrence of said problem in said network device to said terminal device which is the transmission source of data output to said output port detected by said analyzing and second detecting steps, thereby informing the user of said terminal device of said problem.

14. A storage medium for storing a program which is installed and executed in a network device which relays data among a plurality of terminal devices, wherein said program when executed causes said network device to perform the steps of:

analyzing data output from an output port in which a problem occurs, first detecting a problem in said network device and second detecting a terminal device which is a transmission source of the data output to an output port of said network device in which said problem has occurred based on the data analysis; and notifying problem information representing occurrence of said problem in said network device to said terminal device which is the transmission source of data output to said output port detected by said analyzing and second detecting steps, thereby informing the user of said terminal device of said problem.

* * * * *